United States Patent
Gao et al.

(10) Patent No.: US 10,771,224 B2
(45) Date of Patent: Sep. 8, 2020

(54) METHOD AND DEVICE FOR TRANSMITTING FEEDBACK INFORMATION

(71) Applicant: CHINA ACADEMY OF TELECOMMUNICATIONS TECHNOLOGY, Beijing (CN)

(72) Inventors: Xuejuan Gao, Beijing (CN); Xueming Pan, Beijing (CN); Fang-Chen Cheng, Beijing (CN); Qianqian Si, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/088,434

(22) PCT Filed: Feb. 8, 2017

(86) PCT No.: PCT/CN2017/073101
§ 371 (c)(1),
(2) Date: Sep. 25, 2018

(87) PCT Pub. No.: WO2017/161971
PCT Pub. Date: Sep. 28, 2017

(65) Prior Publication Data
US 2019/0123878 A1    Apr. 25, 2019

(30) Foreign Application Priority Data

Mar. 25, 2016  (CN) .......................... 2016 1 0180061
May 13, 2016   (CN) .......................... 2016 1 0320236

(51) Int. Cl.
H04L 5/00   (2006.01)
H04L 1/18   (2006.01)
(Continued)

(52) U.S. Cl.
CPC .......... H04L 5/0055 (2013.01); H04L 1/1854 (2013.01); H04L 1/1864 (2013.01);
(Continued)

(58) Field of Classification Search
None
See application file for complete search history.

(56) References Cited

U.S. PATENT DOCUMENTS 10,397,904 B2 *   8/2019   Islam ................ H04W 72/0413
2005/0013263 A1 * 1/2005   Kim ...................... H04L 1/0068
                                                         370/320
(Continued)

FOREIGN PATENT DOCUMENTS

CN    101414900 A    4/2009
CN    101997663 A    3/2011
(Continued)

OTHER PUBLICATIONS

PCT International Search Report for PCT Counterpart Application No. PCT/CN2017/073101, 5 pgs. (including English translation), (dated May 23, 2017).
(Continued)

*Primary Examiner* — Bunjob Jaroenchonwanit
(74) *Attorney, Agent, or Firm* — Womble Bond Dickinson (US) LLP

(57) ABSTRACT

Disclosed in the present application are a method and device for transmitting feedback information, used to define new feedback timing for downlink data using a dynamic and variable TTI length during transmission, so as to ensure that ACK/NACK feedback information of downlink data is fed back on an earliest uplink transmission resource meeting a processing delay requirement, thereby reducing system delay. The method for transmitting feedback information provided in the present application comprises: receiving
(Continued)

downlink transmission; and determining, at least according to a TTI length and/or a second TTI length of the downlink transmission, an uplink time-domain resource position for ACK/NACK feedback information transmission for the downlink transmission, and sending, on the uplink time-domain resource position, the ACK/NACK feedback information for the downlink transmission, wherein the second TTI length is configured by configuration signaling or is a pre-arranged TTI length used for determining the uplink time-domain resource position of ACK/NACK feedback information transmission.

28 Claims, 7 Drawing Sheets

(51) Int. Cl.
H04L 5/14 (2006.01)
H04L 27/26 (2006.01)
H04W 72/04 (2009.01)

(52) U.S. Cl.
CPC ........ H04L 5/1469 (2013.01); H04L 27/2605 (2013.01); H04W 72/0453 (2013.01)

(56) References Cited

U.S. PATENT DOCUMENTS

| | | | | |
|---|---|---|---|---|
| 2005/0201319 A1* | 9/2005 | Lee | ..................... | H04L 1/0073 370/321 |
| 2010/0027495 A1* | 2/2010 | Che | ..................... | H04L 1/1854 370/329 |
| 2011/0280328 A1* | 11/2011 | Ahn | ..................... | H04L 1/1812 375/260 |
| 2014/0328333 A1 | 11/2014 | Seo et al. | | |
| 2015/0092631 A1* | 4/2015 | Meng | ..................... | H04J 3/00 370/280 |
| 2017/0064706 A1* | 3/2017 | Patel | ................ | H04W 72/0446 |
| 2017/0289995 A1* | 10/2017 | Lin | ................ | H04W 72/0413 |
| 2018/0160413 A1* | 6/2018 | Papasakellariou | .. | H04W 72/042 |
| 2018/0206232 A1* | 7/2018 | Takeda | ................ | H04W 28/04 |
| 2018/0316464 A1* | 11/2018 | Stern-Berkowitz | ......................... | H04L 1/0034 |
| 2019/0007175 A1* | 1/2019 | Kwak | ................ | H04L 5/00 |
| 2019/0191435 A1* | 6/2019 | Gao | ................ | H04W 72/042 |
| 2019/0274154 A1* | 9/2019 | Shi | ................ | H04L 5/00 |
| 2019/0289586 A1* | 9/2019 | Ouchi | ................ | H04L 27/2602 |

FOREIGN PATENT DOCUMENTS

| | | |
|---|---|---|
| CN | 103036657 A | 4/2013 |
| JP | 2017533620 A | 11/2017 |
| WO | WO 2014/061998 A1 | 4/2014 |
| WO | 2015104767 A1 | 7/2015 |
| WO | 2016040290 A1 | 3/2016 |
| WO | 2017014074 A1 | 1/2017 |

OTHER PUBLICATIONS

PCT Written Opinion of the International Searching Authority for PCT Counterpart Application No. PCT/CN2017/073101, 9 pgs. (including English translation), (dated May 23, 2017).
The Japanese Office Action for Application No. 2018-550439 dated Sep. 30, 2019, 5 pages.
Huawei et al.: "Control Signaling Enhancements for Short TTI", 3GPP Draft, R-156461, Mobile Competence Centre, France, Nov. 2015, 10 pages.

* cited by examiner

METHOD AND DEVICE FOR TRANSMITTING FEEDBACK INFORMATION

CROSS REFERENCE TO RELATED APPLICATIONS

This patent application is a U.S. National Phase Application under 35 U.S.C. § 371 of International Application No. PCT/CN2017/073101, filed on 8 Feb. 2017, entitled METHOD AND DEVICE FOR TRANSMITTING FEEDBACK INFORMATION, which claims the benefits of Chinese Patent Application No. 201610180061.X, filed with the Chinese Patent Office on Mar. 25, 2016, and entitled "A method and device for transmitting feedback information", Chinese Patent Application No. 201610320236.2, filed with the Chinese Patent Office on May 13, 2016, and entitled "A method and device for transmitting feedback information", both of which were incorporated reference in their entireties.

FIELD

The present application relates to the field of communications, and particularly to a method and device for transmitting feedback information.

BACKGROUND

As there is a changing demand for mobile communication traffic, a quantity of organizations including the ITU, etc., have defined a shorter user-plane delay as required for future mobile communication systems. A common practice to shorten a user-plane delay is to reduce a length of a Transmission Time Interval (TTI). After the TTI of a traffic channel is reduced, there has been absent so far a solution to how to transmit Acknowledgement (ACK)/Non-Acknowledgment (NACK) feedback information of downlink data.

The existing LTE frame structures (in the LTE Rel-8/9/10/11/12/13) will be introduced as follows.

In a Frame Structure Type 1 (FS1) of an existing LTE FDD system, there are different carrier frequencies for uplink and downlink transmission, and there is the same frame structure for both uplink and downlink transmission. Where a radio frame with a length of 10 ms over each carrier includes ten 1 ms sub-frames and each sub-frame includes two slots with a length of 0.5 ms. Where a length of time of a TTI for uplink and downlink data is 1 ms.

In a Frame Structure Type 2 (FS2) of an existing LTE TDD system, there are different sub-frames or slots at the same frequency for uplink and downlink transmission. In the FS2, each radio frame with a length of 10 ms includes two half-frames with a length of 5 ms, and each half-frame includes five sub-frames with a length of 1 ms. The sub-frames in the FS2 are categorized into downlink sub-frames, uplink sub-frames, and special sub-frames, where each special sub-frame includes three components of a Downlink Pilot Time Slot (DwPTS), a Guard Period (GP), and an Uplink Pilot Time Slot (UpPTS). Where a downlink pilot, downlink traffic data, and downlink control signaling can be transmitted in the DwPTS; no signal is transmitted in the GP; and only a random access signal and a Sounding Reference Symbol (SRS) can be transmitted, but neither uplink traffic data nor uplink control information can be transmitted, in the UpPTS. Each half-frame includes at least one downlink sub-frame, at least one uplink sub-frame, and at most one special sub-frame. Table 1 depicts seven uplink-downlink sub-frame configurations supported in the FS2.

TABLE 1

Uplink-downlink configurations

| Uplink-downlink Configuration | Downlink-to-Uplink Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

ACK/NACK feedback timing in the existing LTE FDD/TDD system will be introduced as follows.

In the LTE Rel-8 system, for the FDD system, each sub-frame has an uplink time domain resource, and ACK/NACK feedback information of a downlink sub-frame with the number n is transmitted in an uplink sub-frame with the number n+4. For the TDD system, frequency resources are shared for uplink and downlink transmission, so sub-frames shall be categorized into uplink and downlink sub-frames as depicted in Table 1, so that ACK/NACK feedback information of different downlink sub-frames may have to be transmitted in the same uplink sub-frame, and as depicted in Table 2, downlink sub-frames for which ACK/NACK is to be fed back in an uplink sub-frame with the number n (i.e., a downlink sub-frame with the number n–k, including a special sub-frame) can be determined according to respective elements in a set K: $\{k_0, k_1, \ldots k_{M-1}\}$ corresponding to the uplink sub-frame, so ACK/NACK feedback information of M downlink sub-frames shall be fed back in the same uplink sub-frame, where M is the quantity of elements in the set K, and may take different values for different uplink sub-frames and different TDD uplink-downlink configurations.

TABLE 2

Downlink association set index K: $\{k_0, k_1, \ldots k_{M-1}\}$ for the TDD system

| UL-DL Configuration | Sub-frame n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |

TABLE 2-continued

Downlink association set index K: {k₀, k₁, ... k_{M-1}} for the TDD system

| UL-DL Configuration | Sub-frame n | | | | | | | | | |
|---|---|---|---|---|---|---|---|---|---|---|
| | 0 | 1 | 2 | 3 | 4 | 5 | 6 | 7 | 8 | 9 |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

It shall be noted that the numbers in Table 2 are set in the unit of a radio frame, and if the sub-frame number n−k is less than zero, for example, then it will indicate that the sub-frame belongs to a preceding radio frame.

When carriers are aggregated, a terminal can operate concurrently over a plurality of carriers, but can only transmit ACK/NACK feedback information in a Physical Uplink Control Channel (PUCCH) over a part of the carriers, e.g., over a Primary Component Carrier (PCC). Accordingly the terminal further needs to feed back ACK/NACK feedback information corresponding to the plurality of carriers, in an uplink sub-frame. When all the carriers aggregated for the terminal are FDD carriers, ACK/NACK feedback timing over each carrier is determined as per n+4; and when all the carriers aggregated for the terminal are TDD carriers, if the same TDD uplink-downlink configuration is applied to all the TDD carriers, then ACK/NACK feedback timing over each carrier will be determined according to the feedback timing corresponding to the TDD uplink-downlink configuration in Table 2. If there are different TDD uplink-downlink configurations of the aggregated TDD carriers, then a reference TDD uplink-downlink configuration will be defined for a Secondary Component Carrier (SCC) under a specific rule, and ACK/NACK feedback will be made according to the feedback timing corresponding to the reference TDD uplink-downlink configuration in Table 2; and when the carriers aggregated for the terminal include both the FDD carrier(s) and the TDD carrier(s), if one of the FDD carrier(s) is a PCC, then ACK/NACK feedback timing over each carrier will be determined as per n+4, and if one of the TDD carrier(s) is a PCC, then a reference TDD uplink-downlink configuration will be defined for an SCC under a specific rule, and ACK/NACK feedback will be made according to the feedback timing corresponding to the reference TDD uplink-downlink configuration in Table 2. In a subsequent LTE release, aggregated carriers can be further grouped into a plurality of carrier groups, and ACK/NACK feedback can be made in a PUCCH over one of the carriers in each carrier group; and at this time, feedback timing of an SCC in each carrier group can be determined according to one of the above instances that correspond to the aggregated carriers in the carrier group.

In conclusion, in the LTE system, the existing channel transmission is generally defined with TTI=1 ms, and when another length of TTI than 1 ms is applied, the length of a TTI for downlink transmission may be changed. Since there are different transmission delays and processing delays required for data with different length of TTIs, there are different time domain positions at which ACK/NACK feedback can be made at the earliest. For this case, the method for feeding back ACK/NACK according to fixed ACK/NACK feedback timing in the existing mechanism will not be applicable any longer.

SUMMARY

Embodiments of the application provide a method and device for transmitting feedback information so as to define new feedback timing for downlink data with a dynamically varying length of TTI to thereby determine that ACK/NACK feedback information of the downlink data to be transmitted over the earliest uplink transmission resource satisfying a processing delay, thus shortening a system delay.

In a first aspect, the embodiments of the application provide a method for transmitting feedback information, the method including: receiving downlink transmission; and determining an uplink time domain resource position for transmitting ACK/NACK feedback information of the downlink transmission, according to at least a length of TTI of the downlink transmission and/or a second length of TTI, and transmitting the ACK/NACK feedback information of the downlink transmission at the uplink time domain resource position; wherein the second length of TTI is a length of TTI, configured by configuration signaling or predefined, for determining an uplink time domain resource position for transmitting ACK/NACK feedback information.

With this method, downlink transmission is received; and an uplink time domain resource position for transmitting ACK/NACK feedback information of the downlink transmission is determined according to at least a length of TTI of the downlink transmission and/or a second length of TTI, and the ACK/NACK feedback information of the downlink transmission is transmitted at the uplink time domain resource position, so as to define new feedback timing to thereby determine ACK/NACK feedback information of the downlink data to be transmitted over the earliest uplink transmission resource satisfying a processing delay, thus shortening a system delay.

Optionally determining the uplink time domain resource position for transmitting the ACK/NACK feedback information of the downlink transmission, according to the length of TTI of the downlink transmission, and transmitting the ACK/NACK feedback information of the downlink transmission at the uplink time domain resource position includes: determining to transmit the ACK/NACK feedback information of the downlink transmission over a first uplink time domain resource that can be used to transmit ACK/NACK and satisfies a time length L1*k or L2*k symbols, after an end time position or an end symbol position of the downlink transmission; or determining to transmit the ACK/NACK feedback information of the downlink transmission over a first uplink time domain resource that can be used to transmit ACK/NACK and is no earlier than a time length L1*k or L2*k symbols, after an end time position or an end symbol position of the downlink transmission; or determining to transmit the ACK/NACK feedback information of the downlink transmission over a first uplink time domain resource that can be used to transmit ACK/NACK after a TTI with an index n+k, where TTIs are numbered as per the length of TTI of the downlink transmission, and an index of TTI of the downlink transmission is n; or determining to transmit the ACK/NACK feedback information of the downlink transmission over a first uplink time domain resource that can be used to transmit ACK/NACK and is spaced from an end time position or an end symbol position of the downlink transmission by no less than a time length L1*k or L2*k symbols; wherein L1 is the length of TTI of the downlink transmission in a unit of time, L2 is the length of TTI of the downlink transmission in a unit of symbol, and k is a predefined or preconfigured positive integer or decimal fraction.

Optionally determining the uplink time domain resource position for transmitting the ACK/NACK feedback information of the downlink transmission, according to the length of TTI of the downlink transmission and/or the second length of TTI, and transmitting the ACK/NACK feedback information of the downlink transmission at the uplink time domain resource position includes: determining to transmit the ACK/NACK feedback information of the downlink transmission over a first uplink time domain resource that can be used to transmit ACK/NACK and satisfies a time length L3*k or L4*k symbols, after an end time position or an end symbol position of the downlink transmission, wherein the end time position or the end symbol position of the downlink transmission is determined according to a first length of TTI; or determining to transmit the ACK/NACK feedback information of the downlink transmission over a first uplink time domain resource that can be used to transmit ACK/NACK and is no earlier than a time length L3*k or L4*k symbols, after an end time position or an end symbol position of the downlink transmission, wherein the end time position or the end symbol position of the downlink transmission is determined according to a first length of TTI; or determining to transmit the ACK/NACK feedback information of the downlink transmission over a first uplink time domain resource that can be used to transmit ACK/NACK after a TTI with an index n+k, where TTIs are numbered as per a first length of TTI, and an index of TTI of the downlink transmission is n; or determining to transmit the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols, wherein the end time position or the end symbol position of the downlink transmission is determined according to a first length of TTI; or determining to transmit the ACK/NACK feedback information of the downlink transmission over a first uplink time domain resource that can be used to transmit ACK/NACK and satisfies a time length L3*k or L4*k symbols, after an end time position or an end symbol position of the downlink transmission; or determining to transmit the ACK/NACK feedback information of the downlink transmission over a first uplink time domain resource that can be used to transmit ACK/NACK and is no earlier than a time length L3*k or L4*k symbols, after an end time position or an end symbol position of the downlink transmission; or determining to transmit the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols; wherein L3 is the first length of TTI in a unit of time, L4 is the first length of TTI in a unit of symbol, and k is a predefined or preconfigured positive integer or decimal fraction; and the first length of TTI is the second length of TTI, or the larger one or the smaller one or the average of the second length of TTI, and the length of TTI of the downlink transmission.

Optionally determining the uplink time domain resource position for transmitting the ACK/NACK feedback information of the downlink transmission, according to at least the length of TTI of the downlink transmission and/or the second length of TTI includes: determining the uplink time domain resource position for transmitting the ACK/NACK feedback information of the downlink transmission, according to the length of TTI of the downlink transmission and/or the second length of TTI, and a feedback delay configured by the configuration signaling.

Optionally determining the uplink time domain resource position for transmitting the ACK/NACK feedback information of the downlink transmission, according to the length of TTI of the downlink transmission and/or the second length of TTI, and the feedback delay configured by the configuration signaling includes: determining preliminarily an uplink time domain resource position for transmitting the ACK/NACK feedback information of the downlink transmission according to the length of TTI of the downlink transmission and/or the second length of TTI; and delaying the preliminarily determined uplink time domain resource position for transmitting the ACK/NACK feedback information of the downlink transmission, according to the feedback delay configured by the configuration signaling, and determining the delayed uplink time domain resource position as a final uplink time domain resource position for transmitting the ACK/NACK feedback information of the downlink transmission.

Optionally the configuration signaling is higher-layer signaling, or the configuration signaling is carried in a first physical downlink control channel corresponding to the downlink transmission; and/or the configuration signaling configures the same second length of TTI or different second lengths of TTI for downlink transmission with different lengths of TTI.

Optionally the configuration signaling configures the second length of TTI as follows: the configuration signaling indicates one of lengths of TTI in a predefined or preconfigured set of lengths of TTI for determining an uplink time domain resource position for transmitting ACK/NACK feedback information of the downlink transmission as the second length of TTI; or the configuration signaling indicates an offset between the second length of TTI and the length of TTI of the downlink transmission.

Optionally the uplink time domain resource that can be used to transmit ACK/NACK includes: a part or all of uplink sub-frames; or a part or all of sub-frames including at least one symbol for uplink transmission; or a part or all of sub-frames including such a quantity of consecutive symbols for uplink transmission that is no less than a preset number; or a part or all of symbols or TTIs for uplink transmission; or a part or all of symbols or TTIs in a part or all of uplink sub-frames; or A symbols or B TTIs in a part or all of uplink sub-frames, wherein A is the quantity of symbols to be occupied for transmitting the ACK/NACK feedback information, and A is a positive integer; and B is the quantity of TTIs to be occupied for transmitting the ACK/NACK feedback information, and B is a positive integer; or a part or all of symbols or TTIs for uplink transmission in a part or all of sub-frames for uplink transmission including at least one symbol for uplink transmission; or A symbols or B TTIs in a part or all of sub-frames including at least one symbol for uplink transmission; or a part or all of symbols or TTIs for uplink transmission in a part or all of sub-frames including such a quantity of consecutive symbols for uplink transmission that is no less than a preset number; or A symbols or B TTIs in a part or all of sub-frames including such a quantity of consecutive symbols for uplink transmission that is no less than a preset number.

Optionally when it is determined to transmit ACK/NACK feedback information of a plurality of instances of the downlink transmission at the same uplink time domain resource, the method includes: concatenating ACK/NACK feedback information corresponding respectively to the plurality of instances of the downlink transmission, according to DAI indication fields in DCI of first physical downlink control channels corresponding respectively to the plurality of instances of the downlink transmission, and transmitting the concatenated ACK/NACK feedback information at the uplink time domain resource position.

Optionally the downlink transmission is a first physical downlink control channel indicating a downlink SPS resource release, or a first physical downlink shared channel with a corresponding first physical downlink control channel, or a first physical downlink shared channel without a corresponding first physical downlink control channel.

Optionally the second length of TTI is an elementary short length of TTI, and the elementary short length of TTI is an elementary transmission unit in the time domain; or the second length of TTI is one of a plurality of system supported lengths of TTI.

In a second aspect, the embodiments of the application provide a method for receiving feedback information, the method including: transmitting downlink transmission; and determining an uplink time domain resource position for transmitting ACK/NACK feedback information of the downlink transmission, according to at least a length of TTI of the downlink transmission and/or a second length of TTI, and receiving the ACK/NACK feedback information of the downlink transmission at the uplink time domain resource position; wherein the second length of TTI is a length of TTI, configured by configuration signaling or predefined, for determining an uplink time domain resource position for transmitting ACK/NACK feedback information.

Optionally determining the uplink time domain resource position for transmitting the ACK/NACK feedback information of the downlink transmission, according to the length of TTI of the downlink transmission, and receiving the ACK/NACK feedback information of the downlink transmission at the uplink time domain resource position includes: determining to receive the ACK/NACK feedback information of the downlink transmission over a first uplink time domain resource that can be used to transmit ACK/NACK and satisfies a time length $L1*k$ or $L2*k$ symbols, after an end time position or an end symbol position of the downlink transmission; or determining to receive the ACK/NACK feedback information of the downlink transmission over a first uplink time domain resource that can be used to transmit ACK/NACK and is no earlier than a time length $L1*k$ or $L2*k$ symbols, after an end time position or an end symbol position of the downlink transmission; or determining to receive the ACK/NACK feedback information of the downlink transmission over a first uplink time domain resource that can be used to transmit ACK/NACK after a TTI with an index n+k, where TTIs are numbered as per the length of TTI of the downlink transmission, and an index of TTI of the downlink transmission is n; or determining to receive the ACK/NACK feedback information of the downlink transmission over a first uplink time domain resource that can be used to transmit ACK/NACK and is spaced from an end time position or an end symbol position of the downlink transmission by no less than a time length $L1*k$ or $L2*k$ symbols; wherein L1 is the length of TTI of the downlink transmission in a unit of time, L2 is the length of TTI of the downlink transmission in a unit of symbol, and k is a predefined or preconfigured positive integer or decimal fraction.

Optionally determining the uplink time domain resource position for transmitting the ACK/NACK feedback information of the downlink transmission, according to the length of TTI of the downlink transmission and/or the second length of TTI, and receiving the ACK/NACK feedback information of the downlink transmission at the uplink time domain resource position includes: determining to receive the ACK/NACK feedback information of the downlink transmission over a first uplink time domain resource that can be used to transmit ACK/NACK and satisfies a time length $L3*k$ or $L4*k$ symbols, after an end time position or an end symbol position of the downlink transmission, wherein the end time position or the end symbol position of the downlink transmission is determined according to a first length of TTI; or determining to receive the ACK/NACK feedback information of the downlink transmission over a first uplink time domain resource that can be used to transmit ACK/NACK and is no earlier than a time length $L3*k$ or $L4*k$ symbols, after an end time position or an end symbol position of the downlink transmission, wherein the end time position or the end symbol position of the downlink transmission is determined according to a first length of TTI; or determining to receive the ACK/NACK feedback information of the downlink transmission over a first uplink time domain resource that can be used to transmit ACK/NACK after a TTI with an index n+k, where TTIs are numbered as per a first length of TTI, and an index of TTI of the downlink transmission is n; or determining to receive the ACK/NACK feedback information of the downlink transmission over a first uplink time domain resource that can be used to transmit ACK/NACK and is spaced from an end time position or an end symbol position of the downlink transmission by no less than a time length $L3*k$ or $L4*k$ symbols, wherein the end time position or the end symbol position of the downlink transmission is determined according to a first length of TTI; or determining to receive the ACK/NACK feedback information of the downlink transmission over a first uplink time domain resource that can be used to transmit ACK/NACK and satisfies a time length $L3*k$ or $L4*k$ symbols, after an end time position or an end symbol position of the downlink transmission; or determining to receive the ACK/NACK feedback information of the downlink transmission over a first uplink time domain resource that can be used to transmit ACK/NACK and is no earlier than a time length $L3*k$ or $L4*k$ symbols, after an end time position or an end symbol position of the downlink transmission; or determining to receive the ACK/NACK feedback information of the downlink transmission over a first uplink time domain resource that can be used to transmit ACK/NACK and is spaced from an end time position or an end symbol position of the downlink transmission by no less than a time length $L3*k$ or $L4*k$ symbols; wherein L3 is the first length of TTI in a unit of time, L4 is the first length of TTI in a unit of symbol, and k is a predefined or preconfigured positive integer or decimal fraction; and the first length of TTI is the second length of TTI, or the larger or smaller one or the average of the second length of TTI and the length of TTI of the downlink transmission.

Optionally determining the uplink time domain resource position for transmitting the ACK/NACK feedback information of the downlink transmission, according to at least the length of TTI of the downlink transmission and/or the second length of TTI includes: determining the uplink time domain resource position for receiving the ACK/NACK feedback information of the downlink transmission, according to the length of TTI of the downlink transmission and/or the second length of TTI, and a feedback delay configured by the configuration signaling.

Optionally determining the uplink time domain resource position for transmitting the ACK/NACK feedback information of the downlink transmission, according to the length of TTI of the downlink transmission and/or the second length of TTI, and the feedback delay configured by the configuration signaling includes: determining preliminarily an uplink time domain resource position for transmitting the ACK/NACK feedback information of the downlink transmission according to the length of TTI of the downlink transmission and/or the second length of TTI; and delaying the preliminarily determined uplink time domain resource position for transmitting the ACK/NACK feedback information of the downlink transmission, according to the feedback delay configured by the configuration signaling, and determining the delayed uplink time domain resource position as a final uplink time domain resource position for transmitting the ACK/NACK feedback information of the downlink transmission.

Optionally the configuration signaling is higher-layer signaling, or the configuration signaling is carried in a first physical downlink control channel corresponding to the downlink transmission; and/or the configuration signaling configures the same second length of TTI or different second lengths of TTI for downlink transmission with different lengths of TTI.

Optionally the configuration signaling configures the second length of TTI as follows: the configuration signaling indicates one of lengths of TTI in a predefined or preconfigured set of lengths of TTI for determining an uplink time domain resource position for transmitting ACK/NACK feedback information of the downlink transmission as the second length of TTI; or the configuration signaling indicates an offset between the second length of TTI and the length of TTI of the downlink transmission.

Optionally the uplink time domain resource that can be used to transmit ACK/NACK includes: a part or all of uplink sub-frames; or a part or all of sub-frames including at least one symbol for uplink transmission; or a part or all of sub-frames including such a quantity of consecutive symbols for uplink transmission that is no less than a preset number; or a part or all of symbols or TTIs for uplink transmission; or a part or all of symbols or TTIs in a part or all of uplink sub-frames; or A symbols or B TTIs in a part or all of uplink sub-frames, wherein A is the quantity of symbols to be occupied for transmitting the ACK/NACK feedback information, and A is a positive integer; and B is the quantity of TTIs to be occupied for transmitting the ACK/NACK feedback information, and B is a positive integer; or a part or all of symbols or TTIs for uplink transmission in a part or all of sub-frames for uplink transmission including at least one symbol for uplink transmission; or A symbols or B TTIs in a part or all of sub-frames including at least one symbol for uplink transmission; or a part or all of symbols or TTIs for uplink transmission in a part or all of sub-frames including such a quantity of consecutive symbols for uplink transmission that is no less than a preset number; or A symbols or B TTIs in a part or all of sub-frames including such a quantity of consecutive symbols for uplink transmission that is no less than a preset number.

Optionally when it is determined that ACK/NACK feedback information of a plurality of instances of the downlink transmission is transmitted at the same uplink time domain resource, the method includes: determining that the ACK/NACK feedback information is obtained by concatenating ACK/NACK feedback information corresponding respectively to the plurality of instances of the downlink transmission according to DAI indication fields in DCI of first physical downlink control channels corresponding respectively to the plurality of instances of the downlink transmission.

Optionally the downlink transmission is a first physical downlink control channel indicating a downlink SPS resource release, or a first physical downlink shared channel with a corresponding first physical downlink control channel, or a first physical downlink shared channel without a corresponding first physical downlink control channel.

Optionally the second length of TTI is an elementary short length of TTI, and the elementary short length of TTI is an elementary transmission unit in the time domain; or the second length of TTI is one of a plurality of system supported lengths of TTI.

In a third aspect, the embodiments of the application provide a device for transmitting feedback information, the device including: a receiving unit configured to receive downlink transmission; and a transmitting unit configured to determine an uplink time domain resource position for transmitting ACK/NACK feedback information of the downlink transmission, according to at least a length of TTI of the downlink transmission and/or a second length of TTI, and to transmit the ACK/NACK feedback information of the downlink transmission at the uplink time domain resource position; wherein the second length of TTI is a length of TTI, configured by configuration signaling or predefined, for determining an uplink time domain resource position for transmitting ACK/NACK feedback information.

Optionally the transmitting unit is configured to determine the uplink time domain resource position for transmitting the ACK/NACK feedback information of the downlink transmission, according to the length of TTI of the downlink transmission, and to transmit the ACK/NACK feedback information of the downlink transmission at the uplink time domain resource position as follows: determine to transmit the ACK/NACK feedback information of the downlink transmission over a first uplink time domain resource that can be used to transmit ACK/NACK and satisfies a time length $L1*k$ or $L2*k$ symbols, after an end time position or an end symbol position of the downlink transmission; or determine to transmit the ACK/NACK feedback information of the downlink transmission over a first uplink time domain resource that can be used to transmit ACK/NACK and is no earlier than a time length $L1*k$ or $L2*k$ symbols, after an end time position or an end symbol position of the downlink transmission; or determine to transmit the ACK/NACK feedback information of the downlink transmission over a first uplink time domain resource that can be used to transmit ACK/NACK after a TTI with an index n+k, where TTIs are numbered as per the length of TTI of the downlink transmission, and an index of TTI of the downlink transmission is n; or determine to transmit the ACK/NACK feedback information of the downlink transmission over a first uplink time domain resource that can be used to transmit ACK/NACK and is spaced from an end time position or an end symbol position of the downlink transmission by no less than a time length $L1*k$ or $L2*k$ symbols; wherein L1 is the length of TTI of the downlink transmission in a unit of time, L2 is the length of TTI of the downlink transmission in a unit of symbol, and k is a predefined or preconfigured positive integer or decimal fraction.

Optionally the transmitting unit is configured to determine the uplink time domain resource position for transmitting the ACK/NACK feedback information of the downlink transmission, according to the length of TTI of the downlink transmission and/or the second length of TTI, and to transmit the ACK/NACK feedback information of the downlink transmission at the uplink time domain resource position as follows: determine to transmit the ACK/NACK feedback information of the downlink transmission over a first uplink time domain resource that can be used to transmit ACK/NACK and satisfies a time length L3*k or L4*k symbols, after an end time position or an end symbol position of the downlink transmission, wherein the end time position or the end symbol position of the downlink transmission is determined according to a first length of TTI; or determine to transmit the ACK/NACK feedback information of the downlink transmission over a first uplink time domain resource that can be used to transmit ACK/NACK and is no earlier than a time length L3*k or L4*k symbols, after an end time position or an end symbol position of the downlink transmission, wherein the end time position or the end symbol position of the downlink transmission is determined according to a first length of TTI; or determine to transmit the ACK/NACK feedback information of the downlink transmission over a first uplink time domain resource that can be used to transmit ACK/NACK after a TTI with an index n+k, where TTIs are numbered as per a first length of TTI, and an index of TTI of the downlink transmission is n; or determine to transmit the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols, wherein the end time position or the end symbol position of the downlink transmission is determined according to a first length of TTI; or determine to transmit the ACK/NACK feedback information of the downlink transmission over a first uplink time domain resource that can be used to transmit ACK/NACK and satisfies a time length L3*k or L4*k symbols, after an end time position or an end symbol position of the downlink transmission; or determine to transmit the ACK/NACK feedback information of the downlink transmission over a first uplink time domain resource that can be used to transmit ACK/NACK and is no earlier than a time length L3*k, or L4*k symbols, after an end time position or an end symbol position of the downlink transmission; or determine to transmit the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols; wherein L3 is the first length of TTI in a unit of time, L4 is the first length of TTI in a unit of symbol, and k is a predefined or preconfigured positive integer or decimal fraction; and the first length of TTI is the second length of TTI, or the larger one or the smaller one or the average of the second length of TTI and the length of TTI of the downlink transmission.

Optionally the transmitting unit is configured to determine the uplink time domain resource position for transmitting the ACK/NACK feedback information of the downlink transmission, according to at least the length of TTI of the downlink transmission and/or the second length of TTI as follows: determine the uplink time domain resource position for transmitting the ACK/NACK feedback information of the downlink transmission, according to the length of TTI of the downlink transmission and/or the second length of TTI, and a feedback delay configured by the configuration signaling.

Optionally the transmitting unit is configured to determine the uplink time domain resource position for transmitting the ACK/NACK feedback information of the downlink transmission, according to the length of TTI of the downlink transmission and/or the second length of TTI, and the feedback delay configured by the configuration signaling as follows: determine preliminarily an uplink time domain resource position for transmitting the ACK/NACK feedback information of the downlink transmission according to the length of TTI of the downlink transmission and/or the second length of TTI; and delay the preliminarily determined uplink time domain resource position for transmitting the ACK/NACK feedback information of the downlink transmission, according to the feedback delay configured by the configuration signaling, and determine the delayed uplink time domain resource position as a final uplink time domain resource position for transmitting the ACK/NACK feedback information of the downlink transmission.

Optionally the configuration signaling is higher-layer signaling, or the configuration signaling is carried in a first physical downlink control channel corresponding to the downlink transmission; and/or the configuration signaling configures the same second length of TTI or different second lengths of TTI for downlink transmission with different lengths of TTI.

Optionally the configuration signaling configures the second length of TTI as follows: the configuration signaling indicates one of lengths of TTI in a predefined or preconfigured set of lengths of TTI for determining an uplink time domain resource position for transmitting ACK/NACK feedback information of the downlink transmission as the second length of TTI; or the configuration signaling indicates an offset between the second length of TTI and the length of TTI of the downlink transmission.

Optionally the uplink time domain resource that can be used to transmit ACK/NACK includes: a part or all of uplink sub-frames; or a part or all of sub-frames including at least one symbol for uplink transmission; or a part or all of sub-frames including such a quantity of consecutive symbols for uplink transmission that is no less than a preset number; or a part or all of symbols or TTIs for uplink transmission; or a part or all of symbols or TTIs in a part or all of uplink sub-frames; or A symbols or B TTIs in a part or all of uplink sub-frames, wherein A is the quantity of symbols to be occupied for transmitting the ACK/NACK feedback information, and A is a positive integer; and B is the quantity of TTIs to be occupied for transmitting the ACK/NACK feedback information, and B is a positive integer; or a part or all of symbols or TTIs for uplink transmission in a part or all of sub-frames for uplink transmission including at least one symbol for uplink transmission; or A symbols or B TTIs in a part or all of sub-frames including at least one symbol for uplink transmission; or a part or all of symbols or TTIs for uplink transmission in a part or all of sub-frames including such a quantity of consecutive symbols for uplink transmission that is no less than a preset number; or A symbols or B TTIs in a part or all of sub-frames including such a quantity of consecutive symbols for uplink transmission that is no less than a preset number.

Optionally when the transmitting unit determines to transmit ACK/NACK feedback information of a plurality of instances of the downlink transmission at the same uplink time domain resource, the transmitting unit is configured to:

concatenate ACK/NACK feedback information corresponding respectively to the plurality of instances of the downlink transmission, according to DAI indication fields in DCI of first physical downlink control channels corresponding respectively to the plurality of instances of the downlink transmission, and transmit the concatenated ACK/NACK feedback information at the uplink time domain resource position.

Optionally the downlink transmission is a first physical downlink control channel indicating a downlink SPS resource release, or a first physical downlink shared channel with a corresponding first physical downlink control channel, or a first physical downlink shared channel without a corresponding first physical downlink control channel.

Optionally the second length of TTI is an elementary short length of TTI, and the elementary short length of TTI is an elementary transmission unit in the time domain; or the second length of TTI is one of a plurality of system supported lengths of TTI.

In a fourth aspect, the embodiments of the application provide a device for receiving feedback information, the device including: a transmitting unit configured to transmit downlink transmission; and a receiving unit configured to determine an uplink time domain resource position for transmitting ACK/NACK feedback information of the downlink transmission, according to at least a length of TTI of the downlink transmission and/or a second length of TTI, and to receive the ACK/NACK feedback information of the downlink transmission at the uplink time domain resource position; wherein the second length of TTI is a length of TTI, configured by configuration signaling or predefined, for determining an uplink time domain resource position for transmitting ACK/NACK feedback information.

Optionally the receiving unit is configured to determine the uplink time domain resource position for transmitting the ACK/NACK feedback information of the downlink transmission, according to the length of TTI of the downlink transmission, and to receive the ACK/NACK feedback information of the downlink transmission at the uplink time domain resource position as follows: determine to receive the ACK/NACK feedback information of the downlink transmission over a first uplink time domain resource that can be used to transmit ACK/NACK and satisfies a time length L1*k or L2*k symbols, after an end time position or an end symbol position of the downlink transmission; or determine to receive the ACK/NACK feedback information of the downlink transmission over a first uplink time domain resource that can be used to transmit ACK/NACK and is no earlier than a time length L1*k or L2*k symbols, after an end time position or an end symbol position of the downlink transmission; or determine to receive the ACK/NACK feedback information of the downlink transmission over a first uplink time domain resource that can be used to transmit ACK/NACK after a TTI with an index n+k, where TTIs are numbered as per the length of TTI of the downlink transmission, and an index of TTI of the downlink transmission is n; or determine to receive the ACK/NACK feedback information of the downlink transmission over a first uplink time domain resource that can be used to transmit ACK/NACK and is spaced from an end time position or an end symbol position of the downlink transmission by no less than a time length L1*k or L2*k symbols; wherein L1 is the length of TTI of the downlink transmission in a unit of time, L2 is the length of TTI of the downlink transmission in a unit of symbol, and k is a predefined or preconfigured positive integer or decimal fraction.

Optionally the receiving unit is configured to determine the uplink time domain resource position for transmitting the ACK/NACK feedback information of the downlink transmission, according to the length of TTI of the downlink transmission and/or the second length of TTI, and to receive the ACK/NACK feedback information of the downlink transmission at the uplink time domain resource position as follows: determine to receive the ACK/NACK feedback information of the downlink transmission over a first uplink time domain resource that can be used to transmit ACK/NACK and satisfies a time length L3*k or L4*k symbols, after an end time position or an end symbol position of the downlink transmission wherein the end time position or the end symbol position of the downlink transmission is determined according to a first length of TTI; or determine to receive the ACK/NACK feedback information of the downlink transmission over a first uplink time domain resource that can be used to transmit ACK/NACK and is no earlier than a time length L3*k or L4*k symbols, after an end time position or an end symbol position of the downlink transmission wherein the end time position or the end symbol position of the downlink transmission is determined according to a first length of TTI; or determine to receive the ACK/NACK feedback information of the downlink transmission over a first uplink time domain resource that can be used to transmit ACK/NACK after a TTI with an index n+k, where TTIs are numbered as per a first length of TTI, and an index of TTI of the downlink transmission is n; or determine to receive the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols, wherein the end time position or the end symbol position of the downlink transmission is determined according to a first length of TTI; or determine to receive the ACK/NACK feedback information of the downlink transmission over a first uplink time domain resource that can be used to transmit ACK/NACK and satisfies a time length L3*k or L4*k symbols, after an end time position or an end symbol position of the downlink transmission; or determine to receive the ACK/NACK feedback information of the downlink transmission over a first uplink time domain resource that can be used to transmit ACK/NACK and is no earlier than a time length L3*k or L4*k symbols, after an end time position or an end symbol position of the downlink transmission; or determine to receive the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols; wherein L3 is the first length of TTI in a unit of time, L4 is the first length of TTI in a unit of symbol, and k is a predefined or preconfigured positive integer or decimal fraction; and the first length of TTI is the second length of TTI, or the larger or smaller one or the average of the second length of TTI and the length of TTI of the downlink transmission.

Optionally the receiving unit is configured to determine the uplink time domain resource position for transmitting the ACK/NACK feedback information of the downlink transmission, according to at least the length of TTI of the downlink transmission and/or the second length of TTI as follows: determine the uplink time domain resource position for transmitting the ACK/NACK feedback information of the downlink transmission, according to the length of TTI of the downlink transmission and/or the second length of TTI, and a feedback delay configured by the configuration signaling.

Optionally the receiving unit is configured to determine the uplink time domain resource position for transmitting the ACK/NACK feedback information of the downlink transmission, according to the length of TTI of the downlink transmission and/or the second length of TTI, and the feedback delay configured by the configuration signaling as follows: determine preliminarily an uplink time domain resource position for transmitting the ACK/NACK feedback information of the downlink transmission according to the length of TTI of the downlink transmission and/or the second length of TTI; and delay the preliminarily determined uplink time domain resource position for transmitting the ACK/NACK feedback information of the downlink transmission, according to the feedback delay configured by the configuration signaling, and determine the delayed uplink time domain resource position as a final uplink time domain resource position for transmitting the ACK/NACK feedback information of the downlink transmission.

Optionally the configuration signaling is higher-layer signaling, or the configuration signaling is carried in a first physical downlink control channel corresponding to the downlink transmission; and/or the configuration signaling configures the same second length of TTI or different second lengths of TTI for downlink transmission with different lengths of TTI.

Optionally the configuration signaling configures the second length of TTI as follows: the configuration signaling indicates one of lengths of TTI in a predefined or preconfigured set of lengths of TTI for determining an uplink time domain resource position for transmitting ACK/NACK feedback information of the downlink transmission as the second length of TTI; or the configuration signaling indicates an offset between the second length of TTI and the length of TTI of the downlink transmission.

Optionally the uplink time domain resource that can be used to transmit ACK/NACK includes: a part or all of uplink sub-frames; or a part or all of sub-frames including at least one symbol for uplink transmission; or a part or all of sub-frames including such a quantity of consecutive symbols for uplink transmission that is no less than a preset number; or a part or all of symbols or TTIs for uplink transmission; or a part or all of symbols or TTIs in a part or all of uplink sub-frames; or A symbols or B TTIs in a part or all of uplink sub-frames, wherein A is the quantity of symbols to be occupied for transmitting the ACK/NACK feedback information, and A is a positive integer; and B is the quantity of TTIs to be occupied for transmitting the ACK/NACK feedback information, and B is a positive integer; or a part or all of symbols or TTIs for uplink transmission in a part or all of sub-frames for uplink transmission including at least one symbol for uplink transmission; or A symbols or B TTIs in a part or all of sub-frames including at least one symbol for uplink transmission; or a part or all of symbols or TTIs for uplink transmission in a part or all of sub-frames including such a quantity of consecutive symbols for uplink transmission that is no less than a preset number; or A symbols or B TTIs in a part or all of sub-frames including such a quantity of consecutive symbols for uplink transmission that is no less than a preset number.

Optionally when the receiving unit determines that ACK/NACK feedback information of a plurality of instances of the downlink transmission is transmitted at the same uplink time domain resource, the receiving unit is configured to: determine that the ACK/NACK feedback information is obtained by concatenating ACK/NACK feedback information corresponding respectively to the plurality of instances of the downlink transmission, according to DAI indication fields in DCI of first physical downlink control channels corresponding respectively to the plurality of instances of the downlink transmission.

Optionally the downlink transmission is a first physical downlink control channel indicating a downlink SPS resource release, or a first physical downlink shared channel with a corresponding first physical downlink control channel, or a first physical downlink shared channel without a corresponding first physical downlink control channel.

Optionally the second length of TTI is an elementary short length of TTI, and the elementary short length of TTI is an elementary transmission unit in the time domain; or the second length of TTI is one of a plurality of system supported lengths of TTI.

In a fifth aspect, the embodiments of the application provide a device including a processor, a transceiver, and a memory, wherein the processor is configured to read programs in the memory to perform the method according to any one of the embodiments in the first aspect.

In a sixth aspect, the embodiments of the application further provide a device including a processor, a transceiver, and a memory, wherein the processor is configured to read programs in the memory to perform the method according to any one of the embodiments in the second aspect.

BRIEF DESCRIPTION OF THE DRAWINGS

In order to make the technical solutions according to the embodiments of the application more apparent, the drawings to which reference is to be made in a description of the embodiments will be introduced below in brief, and apparently the drawings to be described below are only a part of the embodiments of the application. Those ordinarily skilled in the art can further derive from these drawings other drawings without any inventive effort.

DETAILED DESCRIPTION OF THE EMBODIMENTS

Embodiments of the application provide a method and device for transmitting feedback information so as to define new feedback timing for downlink data with a dynamically varying length of TTI, to thereby feed back ACK/NACK feedback information of the downlink data over the earliest uplink transmission resource that satisfies a processing delay, thus shortening a system delay.

Figure 1:
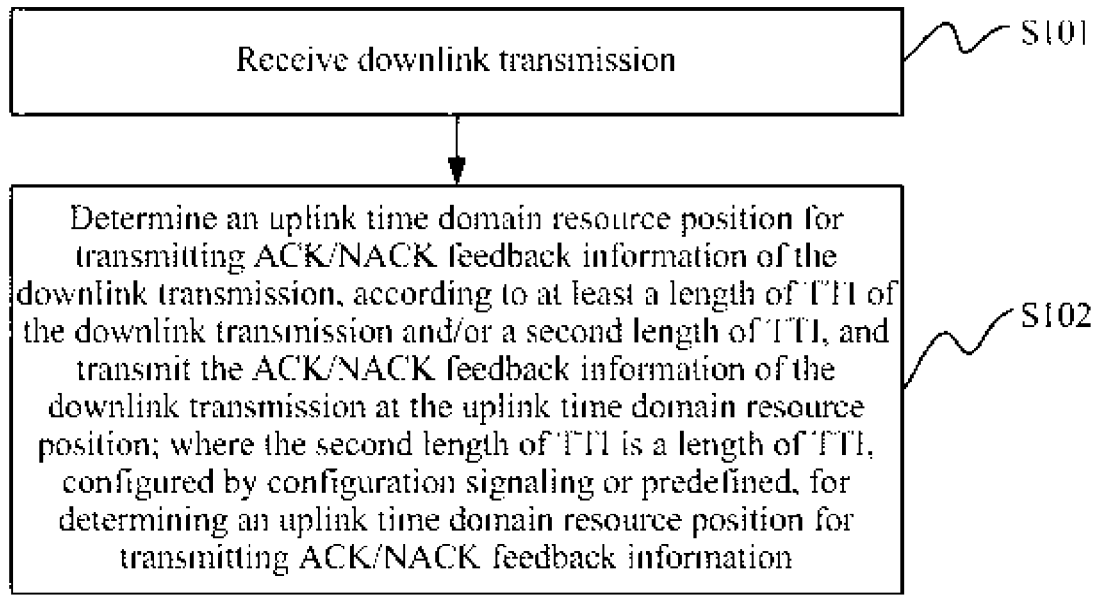
FIG. 1 is a schematic flow chart of a method for transmitting feedback information according to the embodiments of the application.

Referring to FIG. 1, the embodiments of the application provide a method for transmitting feedback information, and the method is performed at the User Equipment (UE) side, and includes following operations.

The operation S101 is to receive downlink transmission.

The operation S102 is to determine an uplink time domain resource position for transmitting ACK/NACK feedback information of the downlink transmission, according to at least a length of TTI of the downlink transmission and/or a second length of TTI, and to transmit the ACK/NACK feedback information of the downlink transmission at the uplink time domain resource position; where the second length of TTI is a length of TTI, configured by configuration signaling or predefined, for determining an uplink time domain resource position for transmitting ACK/NACK feedback information.

Optionally the configuration signaling is higher-layer signaling, or the configuration signaling is carried in a first physical downlink control channel corresponding to the downlink transmission; and/or the configuration signaling configures the same length of TTI or different lengths of TTI for determining an uplink time domain resource position for transmitting ACK/NACK feedback information, for downlink transmission with different lengths of TTI.

Optionally the configuration signaling configures a length of TTI for determining an uplink time domain resource position for transmitting ACK/NACK feedback information as follows: the configuration signaling indicates one of lengths of TTI in a predefined or preconfigured set of lengths of TTI for determining the uplink time domain resource position for transmitting the ACK/NACK feedback information of the downlink transmission as the second length of TTI; or the configuration signaling indicates an offset between the second length of TTI and the length of TTI of the downlink transmission.

Optionally the downlink transmission is a first physical downlink control channel indicating a downlink SPS resource release, or a first physical downlink shared channel with a corresponding first physical downlink control channel (i.e., a dynamically scheduled first physical downlink shared channel), or a first physical downlink shared channel without a corresponding first physical downlink control channel (i.e., a first physical downlink shared channel of SPS); where a length of TTI of the first physical downlink control channel and/or a length of TTI of the first physical downlink shared channel is equal to or less than 1 ms. Of course, the length(s) of TTI thereof may alternatively be greater than 1 ms.

In the embodiments of the application, for example, the UE can determine a time domain position (i.e., a time domain resource) of its ACK/NACK feedback dynamically according to a length of DL TTI, for example, the ACK/NACK feedback is transmitted in the earliest UL TTI that starts with an end position of a DL TTI and satisfies three lengths of DL TTI after the end position of the DL TTI.

Several schemes in which the UE side determines feedback timing of feedback information will be described as follows.

The length of TTI of the downlink transmission is L1 milliseconds (ms) or L2 symbols; where L1 is 1 ms or a decimal fraction less than 1 ms, and L2 is 14 or less than 14 in the case of a normal CP, and 12 or less than 12 in the case of an extended CP. Of course, L1 can alternatively be a decimal fraction or an integer greater than 1 ms, and L2 can alternatively be greater than 14 in the case of the normal CP, and greater than 12 in the case of the extended CP.

The uplink time domain resource position for transmitting the ACK/NACK feedback information of the downlink transmission is determined according to at least the length of TTI of the downlink transmission (i.e., a length of TTI at which the downlink transmission is scheduled, which will apply hereinafter) and/or the second length of TTI as follows.

In a first scheme, the uplink time domain resource position for transmitting the ACK/NACK feedback information of the downlink transmission is determined according to the length of TTI of the downlink transmission as follows.

Determine to transmit the ACK/NACK feedback information of the downlink transmission over a first uplink time domain resource that can be used to transmit ACK/NACK and satisfies a time length L1*k or L2*k symbols, after an end time position or an end symbol position of the downlink transmission.

Or, determine to transmit the ACK/NACK feedback information of the downlink transmission over a first uplink time domain resource that can be used to transmit ACK/NACK and is no earlier than a time length L1*k or L2*k symbols, after an end time position or an end symbol position of the downlink transmission.

Or, determine to transmit the ACK/NACK feedback information of the downlink transmission over a first uplink time domain resource that can be used to transmit ACK/NACK after a TTI with the index n+k, where TTIs are numbered as per the length of TTI of the downlink transmission, and the index of TTI of the downlink transmission is n.

Or, determine to transmit the ACK/NACK feedback information of the downlink transmission over a first uplink time domain resource that can be used to transmit ACK/NACK and is spaced by no less than a time length L1*k or L2*k symbols (that is, precluding the ACK/NACK transmission position and the last symbol of the downlink transmission, and for example, the third symbol is spaced from the first symbol by one symbol), after an end time position or an end symbol position of the downlink transmission.

In the first scheme above, L1 is the length of TTI of the downlink transmission in a unit of time, L2 is the length of TTI of the downlink transmission in a unit of symbol, and k is a predefined or preconfigured positive integer or decimal fraction.

In a second scheme, the uplink time domain resource position for transmitting the ACK/NACK feedback information of the downlink transmission is determined according to the second length of TTI; or in a third scheme, the uplink time domain resource position for transmitting the ACK/NACK feedback information of the downlink transmission is determined according to the length of TTI of the downlink transmission and the second length of TTI as follows.

Determine to transmit the ACK/NACK feedback information of the downlink transmission over a first uplink time domain resource that can be used to transmit ACK/NACK and satisfies a time length L3*k or L4*k symbols, after an end time position or an end symbol position of the downlink transmission, wherein the end time position or the end symbol position of the downlink transmission is determined according to a first length of TTI (i.e., an end position determined according to the first length of TTI by starting with a start symbol of the downlink transmission, where the end position may be later than an end position determined according to a length of TTI at which the downlink transmission is really scheduled, and this will apply hereinafter).

Or, determine to transmit the ACK/NACK feedback information of the downlink transmission over a first uplink time domain resource that can be used to transmit ACK/NACK and is no earlier than a time length L3*k or L4*k symbols, after an end time position or an end symbol position of the downlink transmission, wherein the end time position or the end symbol position of the downlink transmission is determined according to a first length of TTI.

Or, determine to transmit the ACK/NACK feedback information of the downlink transmission over a first uplink time domain resource that can be used to transmit ACK/NACK after a TTI with the index n+k, where TTIs are numbered as per a first length of TTI, and the index of TTI of the downlink transmission is n.

Or, determine to transmit the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols, wherein the end time position or the end symbol position of the downlink transmission is determined according to a first length of TTI (that is, the space precludes the ACK/NACK transmission position and the last symbol of the downlink transmission, and for example, the third symbol is spaced from the first symbol by one symbol).

Or, determine to transmit the ACK/NACK feedback information of the downlink transmission over a first uplink time domain resource that can be used to transmit ACK/NACK and satisfies a time length L3*k or L4*k symbols, after an end time position or an end symbol position of the downlink transmission.

Or, determine to transmit the ACK/NACK feedback information of the downlink transmission over a first uplink time domain resource that can be used to transmit ACK/NACK and is no earlier than a time length L3*k or L4*k symbols, after an end time position or an end symbol position of the downlink transmission.

Or, determine to transmit the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols.

Here the first length of TTI is the second length of TTI (in the second scheme), or the first length of TTI is the larger one (in the third scheme) or the smaller one or the average of the second length of TTI and the length of TTI of the downlink transmission.

Here the length of TTI configured in the configuration signaling is L3 milliseconds (ms) or L4 symbols; where L3 is 1 ms or a decimal fraction less than 1 ms, and L4 is the quantity of symbols configured in the configuration signaling; and L4 is 14 or less than 14 in the case of a normal CP, and 12 or less than 12 in the case of an extended CP. Of course, L3 can alternatively be a decimal fraction or an integer greater than 1 ms; and L4 can alternatively be greater than 14 in the case of a normal CP, and greater than 12 in the case of an extended CP.

The configuration signaling is higher-layer signaling, e.g., Radio Resource Control (RRC) signaling, Media Access Control (MAC) signaling, Master Information Block (MIB) signaling, System Information Block (SIB) signaling, etc.; or the configuration signaling is carried in a first physical downlink control channel corresponding to the downlink transmission, i.e., a specific bit field in DCI of the first physical downlink control channel indicates the second length of TTI.

The configuration signaling may configure the same second length of TTI or different second lengths of TTI for the downlink data to be transmitted using different lengths of TTI; and for example, the second length of TTI is configured as b1 for data to be transmitted using a length of TTI which is a1, and as b2 for data to be transmitted using a length of TTI which is a2, where a1 and a2 can be a length of TTI or a set of lengths of TTI, that is, when a1 includes two or more lengths of TTI, an uplink time domain resource position for transmitting ACK/NACK feedback information of data with each length of TTI in a1 is determined according to the length of TTI which is b1.

The configuration signaling can indicate the second length of TTI directly; where the length of TTI is one of lengths of TTI in a predefined set and a correspondence relationship between the second length of TTI and the state of the indication field in the configuration signaling is predefined or preconfigured. Or the configuration signaling indicates an offset between the second length of TTI and the length of TTI of the downlink transmission, where a correspondence relationship between the offset and the state of the indication field in the configuration signaling is predefined or preconfigured. When the offset is 0, it indicates that the uplink time domain resource position for transmitting the ACK/NACK feedback information of the downlink transmission is determined according to the length of TTI of the downlink transmission, and when the offset is not 0, a length of TTI for actually determining the ACK/NACK time domain position is determined according to the length of TTI of the downlink transmission and the offset. For example, the sum or product of the length of TTI of the downlink transmission and the offset is determined as a length of TTI for actually determining the ACK/NACK time domain position. Of course, another state of the configuration signaling can alternatively be predefined to indicate that the uplink time domain resource position for transmitting the ACK/NACK feedback information of the downlink transmission is determined according to the length of TTI of the downlink transmission, and the remaining states or a part thereof can indicate an actual offset.

In the first, second, and third schemes above, a processing delay is assumed to be a period of time for the operations of processing downlink transmission, generating ACK/NACK, etc. And for example, the processing delay can be defined as the length of TTI of the downlink transmission*k, or the second length of TTI*k, or max (the second length of TTI, the length of TTI of the downlink transmission), where max (a, b) is the larger one of a and b, and k is a predefined or preconfigured positive integer or decimal fraction. For example, k=3, that is, the processing delay does not include a period of time for receiving downlink transmission, or k=4, that is, the processing delay includes a period of time for receiving downlink transmission. In the first, second, and third schemes above, the processing delay does not include a period of time for receiving downlink transmission, for example, but of course, if the processing delay includes a period of time for receiving downlink transmission, then the operations above will apply thereto except that the start point of the delay in the description above shall be a start time position or a start symbol position, instead of an end time position or an end symbol position, of each downlink transmission, thus a repeated description thereof will be omitted here.

In a fourth scheme, in the process above of determining the feedback timing of the feedback information, the uplink time domain resource position for transmitting the ACK/NACK feedback information of the downlink transmission is determined according to the length of TTI of the downlink transmission, and/or the second length of TTI, and a feedback delay indication field configured in the configuration signaling.

Stated otherwise, in the fourth scheme, the uplink time domain resource position for transmitting the ACK/NACK feedback information of the downlink transmission is preliminarily determined according to the length of TTI of the downlink transmission and/or the second length of TTI (this operation can be performed as in the first, second, and third schemes above).

The preliminarily determined uplink time domain resource position for transmitting the ACK/NACK feedback information of the downlink transmission is delayed according to the feedback delay configured by the configuration signaling, and the delayed uplink time domain resource position is determined as the uplink time domain resource position for transmitting the ACK/NACK feedback information of the downlink transmission.

Optionally, in the fourth scheme: a state of the feedback delay indication field indicates that "the uplink time domain resource position for transmitting the ACK/NACK feedback information of the downlink transmission is determined according to the length of TTI of the downlink transmission or the second length of TTI", and the remaining states of the feedback delay indication field, or a part thereof indicate respectively that "the uplink time domain resource position for transmitting the ACK/NACK feedback information of the downlink transmission, determined according to the length of TTI of the downlink transmission and/or the second length of TTI is delayed by different lengths of delay to determine the uplink time domain resource position for transmitting the ACK/NACK feedback information of the downlink transmission". Where a granularity of the delay can be a unit of the length of a time domain resource for transmitting a piece of ACK/NACK, and for example, if ACK/NACK is transmitted in S1 symbols or S2 TTIs each time, then the delay indication field may indicate no delay, or a delay of S1 symbols or an integer multiple thereof, or can indicate a delay of S2 TTIs or an integer multiple thereof; or the granularity can be a unit of each time domain resource over which ACK/NACK can be transmitted defined in the system, and for example, if five ACK/NACK time resource positions are defined in a radio frame, then the delay indication field may indicate no delay, or a delay of 1, 2, 3, or 4 ACK/NACK time domain resources.

Here k is predefined or preconfigured as a positive integer or a decimal fraction, e.g., k=3 or 4, or k is a decimal fraction less than 3 or 4.

Here the uplink time domain resource(s) that can be used to transmit ACK/NACK (i.e. over which ACK/NACK can be transmitted) is (or are) as follows.

The time domain resource(s) is (or are) the symbol(s)/TTI(s) for uplink transmission in a sub-frame in which a part or all of symbols are used for uplink transmission. Taking the symbol(s) as an example, for any one symbol for uplink transmission in a sub-frame, for example, if the symbol satisfies the condition above, then ACK/NACK will be transmitted starting with the symbol, where the ACK/NACK may be transmitted in only the symbol or in A consecutive symbols starting with the symbol. And if there are no A consecutive symbols starting with the symbol in the sub-frame including the symbol, then the ACK/NACK will be transmitted in an actual quantity of consecutive symbols starting with the symbol, or transmitted in only the symbol as predefined. Stated otherwise, if there is an uplink time domain resource, then the ACK/NACK will be fed back as early as possible to thereby shorten a delay. The same description will apply to the TTI(s), thus a repeated description thereof will be omitted here.

Alternatively the time resource(s) is (or are) the symbol(s)/TTI(s) for uplink transmission (where there may be no limitations of sub-frame boundaries). Taking the symbol(s) as an example, for any one symbol for uplink transmission, for example, if the symbol satisfies the condition above, then ACK/NACK will be transmitted starting with the symbol, where the ACK/NACK may be transmitted in only the symbol or in A consecutive symbols starting with the symbol; and if there are no A consecutive symbols starting with the symbol, then the ACK/NACK will be transmitted in an actual quantity of consecutive symbols starting with the symbol, or transmitted in only the symbol as predefined. Stated otherwise, if there is an uplink time domain resource, then the ACK/NACK will be fed back as early as possible to thereby shorten a delay. If the symbol satisfying the condition is located at the tail of a sub-frame, and there are no A consecutive symbols in the sub-frame, but at least a first part of symbols in the next sub-frame are also uplink symbols, then the ACK/NACK may be transmitted in A consecutive symbols starting with the symbol and across the two sub-frames. The same description will apply to the TTI(s), thus a repeated description thereof will be omitted here.

Alternatively the time resource(s) is (or are) a part of the symbol(s)/TTI(s) for uplink transmission in a sub-frame in which a part or all of symbols are used for uplink transmission. Taking the symbol(s) as an example, for example, the time resource(s) is (or are) the first B symbols or the last B symbols among the symbol(s) for uplink transmission in the sub-frame, where B is a predefined or preconfigured positive integer greater than 0. And for a symbol at a specific position in the sub-frame, e.g., the first symbol or the counted-down B-th symbol among the symbol(s) for uplink transmission in the sub-frame, if the symbol satisfies the condition above, then ACK/NACK will be transmitted starting with the symbol, where the ACK/NACK may be transmitted in only the symbol or in B consecutive symbols starting with the symbol. And in another example, for the first symbol or the last symbol among the symbol(s) for uplink transmission in the sub-frame, if the symbol satisfies the condition above, then ACK/NACK will be transmitted in the symbol, where the ACK/NACK may be transmitted in only the symbol. The same description will apply to the TTI(s), thus a repeated description thereof will be omitted here.

Alternatively the time resource(s) is (or are) a part or all of symbols/TTIs for uplink transmission in a sub-frame in which the quantity of symbols for uplink transmission is no less than A consecutive symbols. Taking symbols as an example, for example, for the first A symbols among N consecutive symbols for uplink transmission in the sub-frame (that is, if the first symbol satisfies the condition above, then all of the first A symbols will satisfy it), if they satisfy the condition above, then ACK/NACK will be transmitted starting with the first one of the N consecutive symbols, where the ACK/NACK is transmitted in A consecutive symbols; in another example, for the last A symbols among N consecutive symbols for uplink transmission in the sub-frame (that is, if the counted-down A-th symbol among the N consecutive symbols satisfies the condition above, then all of the last A symbols will satisfy it), if they satisfy the condition above, then ACK/NACK will be transmitted starting with the counted-down A-th symbol among the N consecutive symbols, where the ACK/NACK is transmitted in A consecutive symbols; in another example, for each one of the first (N-A)-th symbols among N consecutive symbols for uplink transmission in the sub-frame (that is, if the current symbol satisfies the condition above, then all of A consecutive symbols starting with the symbol will satisfy it), if they satisfy the condition above, then ACK/NACK will be transmitted starting with the symbol, where the ACK/NACK is transmitted in A consecutive symbols; and in another example, for each one of the last (N-A)-th symbols among N consecutive symbols for uplink transmission in the sub-frame (that is, if the current symbol satisfies the condition above, then all of A consecutive symbols starting with the symbol will satisfy it), if they satisfy the condition above, then ACK/NACK will be transmitted starting with the symbol, where the ACK/NACK is transmitted in A consecutive symbols. The same description will apply to the TTIs, although a repeated description thereof will be omitted here. In the first to fourth schemes above in which the uplink time domain resource position for transmitting the ACK/NACK feedback information of the downlink transmission is determined, if it is determined to transmit ACK/NACK feedback information of a plurality of instances of the downlink transmission, at the same uplink time domain resource position, then the ACK/NACK feedback information corresponding respectively to the plurality of instances of the downlink transmission will be concatenated together according to DAI indication fields in DCI of the first physical downlink control channels corresponding respectively to the plurality of instances of the downlink transmission, encoded jointly, and then being transmitted; where a DAI is a counter which can indicate the total quantity of instances of the downlink transmission, for which ACK/NACK is to be fed back at the same time domain position, scheduled over the same carrier until the current downlink transmission, or the total quantity of instances of the downlink transmission, for which ACK/NACK is to be fed back at the same time domain position, scheduled over a plurality of carriers and/or in a plurality of TTIs until the current downlink transmission. With the continuity of the value of the DAI, it can be determined whether there is intermediate downlink transmission lost, and for example, the DAI indicates 1 when the first downlink transmission is received, and 3 when the second downlink transmission is received, which indicates that there is downlink transmission lost between the received first and second downlink transmission, so NACK can be generated as feedback information for this lost downlink transmission, and the DAI value thereof can be determined as 2, so that ACK/NACK of the three downlink transmission can be sorted and concatenated together according to the DAI values, and for example, can be sorted and concatenated in an ascending order of the DAI values. Furthermore the total quantity indicated in the DAI may not include any first physical downlink shared channel of SPS, or the total quantity may only accumulate the quantity of first physical downlink control channels indicating a downlink SPS resource release, and first physical downlink shared channels with corresponding first physical downlink control channels.

Optionally for a first physical downlink shared channel of SPS, i.e., a first physical downlink shared channel without a corresponding first physical downlink control channel, if the second, third, or fourth scheme is applied, and the configuration signaling is carried in a first physical downlink control channel, then a time domain position for feeding back ACK/NACK of the first physical downlink shared channel of SPS will be determined according to related information configured in an indication field in a first physical downlink control channel activating the first physical downlink shared channel of SPS. If ACK/NACK of a plurality of instances of the downlink transmission is to be concatenated, then the ACK/NACK of the first physical downlink shared channel of SPS may be predefined to be concatenated at the first or last position in a sequence.

Optionally the ACK/NACK feedback information is transmitted via a PUCCH or PUSCH structure in the uplink time domain resource. The PUCCH structure can reuse the mapping and spreading patterns of the PUCCH format 4/5 by only changing the time domain transmission length and the frequency domain resource size; or of course, the structure of another PUCCH format can be used alternatively by the PUCCH structure.

Further to any one of the embodiments above, the second length of TTI is an elementary short length of TTI, and the elementary short length of TTI is an elementary transmission unit in the time domain; or the second length of TTI is one of a plurality of system supported lengths of TTI.

Figure 2:
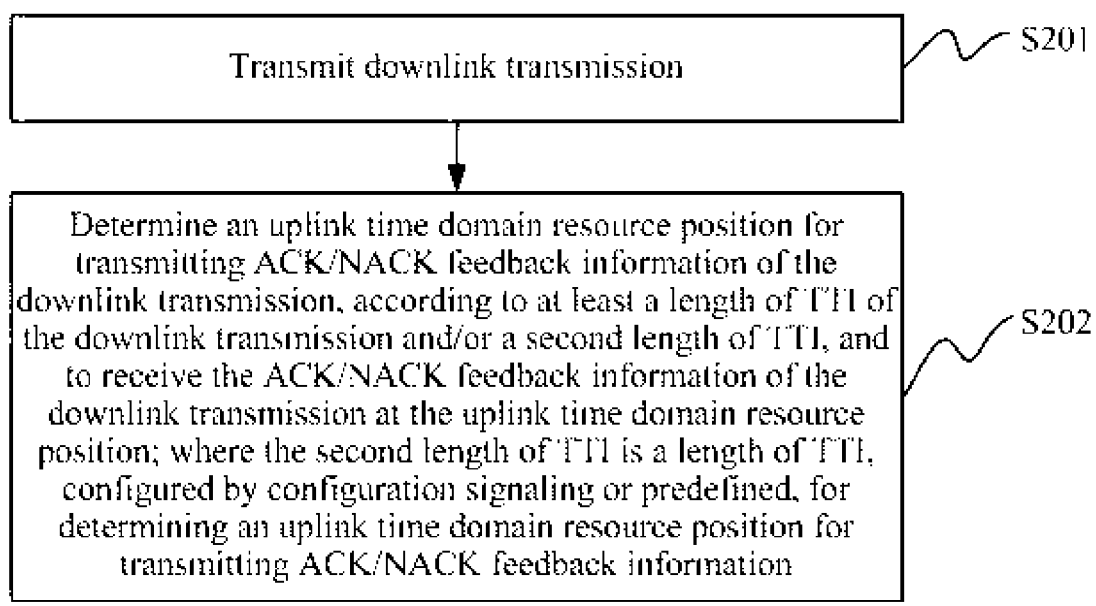
FIG. 2 is a schematic flow chart of a method for receiving feedback information according to the embodiments of the application.

Correspondingly at the base station side, referring to FIG. 2, a method for receiving feedback information according to the embodiments of the application includes following operations.

The operation S201 is to transmit downlink transmission.

The operation S202 is to determine an uplink time domain resource position for transmitting ACK/NACK feedback information of the downlink transmission, according to at least a length of TTI of the downlink transmission and/or a second length of TTI, and to receive the ACK/NACK feedback information of the downlink transmission at the uplink time domain resource position; where the second length of TTI is a length of TTI, configured by configuration signaling or predefined, for determining an uplink time domain resource position for transmitting ACK/NACK feedback information.

The other detailed description will be the same as in the flow above at the terminal side except that the base station side "receives" the ACK/NACK feedback information of the downlink transmission at the uplink time domain resource position, thus a repeated description thereof will be omitted here.

Optionally the configuration signaling is higher-layer signaling, or the configuration signaling is carried in a first physical downlink control channel corresponding to the downlink transmission; and/or the configuration signaling configures the same length of TTI or different lengths of TTI for downlink transmission with different lengths of TTI.

Optionally the configuration signaling configures the second length of TTI as follows: the configuration signaling indicates one of lengths of TTI in a predefined or preconfigured set of lengths of TTI for determining the uplink time domain resource position for transmitting the ACK/NACK feedback information of the downlink transmission as the second length of TTI; or the configuration signaling indicates an offset between the second length of TTI and the length of TTI of the downlink transmission.

Optionally the downlink transmission is a first physical downlink control channel indicating a downlink SPS resource release, or a first physical downlink shared channel with a corresponding first physical downlink control channel, or a first physical downlink shared channel without a corresponding first physical downlink control channel; where a length of TTI of the first physical downlink control channel and/or a length of TTI of the first physical downlink shared channel is equal to or less than 1 ms. Of course, the length(s) of TTI thereof may alternatively be greater than 1 ms.

Further to any one of the embodiments above, the second length of TTI is an elementary short length of TTI, and the elementary short length of TTI is an elementary transmission unit in the time domain; or the second length of TTI is one of a plurality of system supported lengths of TTI.

Several embodiments will be described below.

Figure 3:
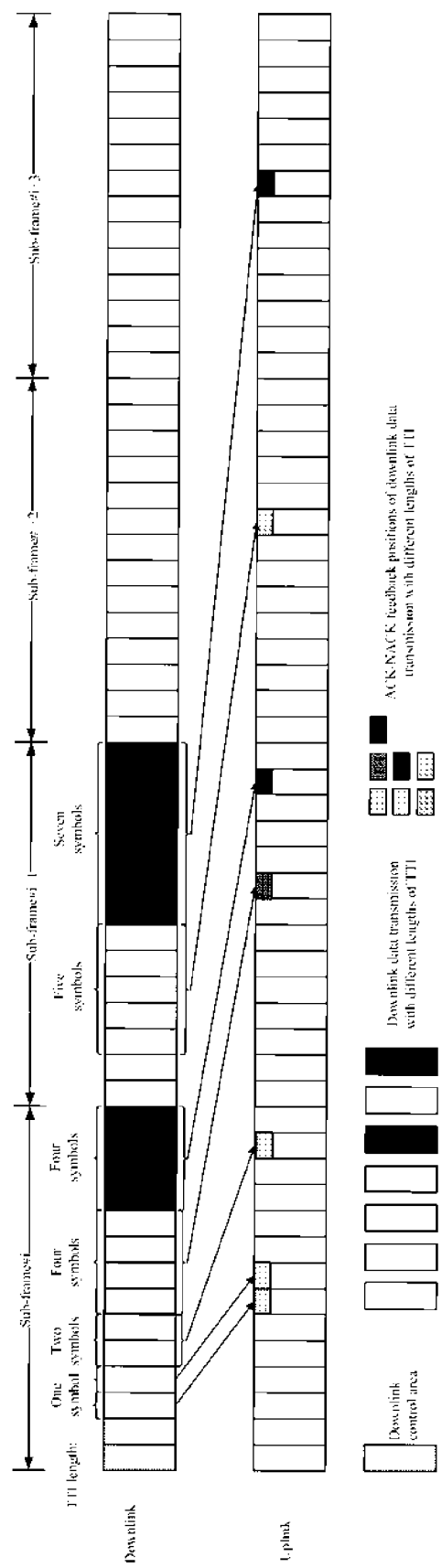
FIG. 3 is a schematic feedback timing diagram of feedback information according to the embodiments of the application.

In a first embodiment (corresponding to the first scheme), as illustrated in FIG. 3, taking an FDD carrier with a normal CP as an example, for example, k=3, and a time domain position for feeding back ACK/NACK thereof is determined directly according to a length of TTI of downlink transmission.

The length of TTI of the first downlink data transmission is one symbol, and the first downlink data transmission is transmitted in the third symbol in the sub-frame # i, so ACK/NACK can be fed back at earliest in the fourth symbol after said symbol (or a symbol spaced from said symbol by no less than three symbols), i.e., the seventh symbol (uplink) in the sub-frame, as per the required delay of 1*3.

The length of TTI of the second downlink data transmission is one symbol, and the second downlink data transmission is transmitted in the four symbol in the sub-frame # i, so ACK/NACK can be fed back at earliest in the fourth symbol after said symbol (or a symbol spaced from said symbol by no less than three symbols), i.e., the eighth symbol (uplink) in the sub-frame, as per the required delay of 1*3.

The length of TTI of the third downlink data transmission is two symbols, and the third downlink data transmission is transmitted in the fifth and sixth symbols in the sub-frame # i, so ACK/NACK can be fed back at earliest in the seventh symbol after the last symbol occupied by the third downlink data transmission (or a symbol spaced from the last symbol by no less than six symbols), i.e., the thirteenth symbol (uplink) in the sub-frame, as per the required delay of 2*3.

The length of TTI of the fourth downlink data transmission is four symbols, and the fourth downlink data transmission is transmitted in the seventh to tenth symbols in the sub-frame # i, so ACK/NACK can be fed back at earliest in the thirteenth symbol after the last symbol occupied by the fourth downlink data transmission (or a symbol spaced from the last symbol by no less than twelve symbols), i.e., the ninth symbol (uplink) in the sub-frame # i+1, as per the required delay of 4*3.

The length of TTI of the fifth downlink data transmission is four symbols, and the fifth downlink data transmission is transmitted in the eleventh to fourteenth symbols in the sub-frame # i, so ACK/NACK can be fed back at earliest in the thirteenth symbol after the last symbol occupied by the fifth downlink data transmission (or a symbol spaced from the last symbol by no less than twelve symbols), i.e., the thirteenth symbol (uplink) in the sub-frame # i+1, as per the required delay of 4*3.

The length of TTI of the sixth downlink data transmission is five symbols, and the sixth downlink data transmission is transmitted in the second to sixth symbols in the sub-frame # i+1, so ACK/NACK can be fed back at earliest in the sixteenth symbol after the last symbol occupied by the sixth downlink data transmission (or a symbol spaced from the last symbol by no less than fifteen symbols), i.e., the ninth symbol (uplink) in the sub-frame # i+2, as per the required delay of 5*3.

The length of TTI of the seventh downlink data transmission is seven symbols, and the seventh downlink data transmission is transmitted in the seventh to fourteenth symbols in the sub-frame # i+1, so ACK/NACK can be fed back at earliest in the $22^{nd}$ symbol after the last symbol occupied by the seventh downlink data transmission (or a symbol spaced from the last symbol by no less than 21 symbols), i.e., the eighth symbol (uplink) in the sub-frame # i+3, as per the required delay of 7*3.

In this embodiment, for example, ACK/NACK can be transmitted in each symbol of each uplink sub-frame in the FDD system, and if ACK/NACK can only be transmitted in a part of symbols, e.g., the last symbol, of each uplink sub-frame, then for the first, second, and third downlink transmission, no ACK/NACK can be transmitted at the ACK/NACK feedback positions determined as described above, so the ACK/NACK shall be delayed to and fed back in the last symbol of the sub-frame # i; for the fourth and fifth downlink transmission, alike the ACK/NACK shall be delayed to and fed back in the last symbol of the sub-frame # i+1; for the sixth downlink transmission, alike the ACK/NACK shall be delayed to and fed back in the last symbol of the sub-frame # i+2; and for the seventh downlink transmission, alike the ACK/NACK shall be delayed to and fed back in the last symbol of the sub-frame # i+3. Stated otherwise, an overhead of transmitting the ACK/NACK in the uplink is lowered by feeding back the ACK/NACK of a plurality of instances of the downlink transmission in the same uplink transmission, at the cost of a longer delay in feedback of the ACK/NACK of a part of the downlink transmission, without departing from the claimed scope of the application. Of course, the ACK/NACK can alternatively be transmitted in only a part of the sub-frames, or at a part of symbol positions in a part of the sub-frames, although a repeated description thereof will be omitted here.

Figure 4:
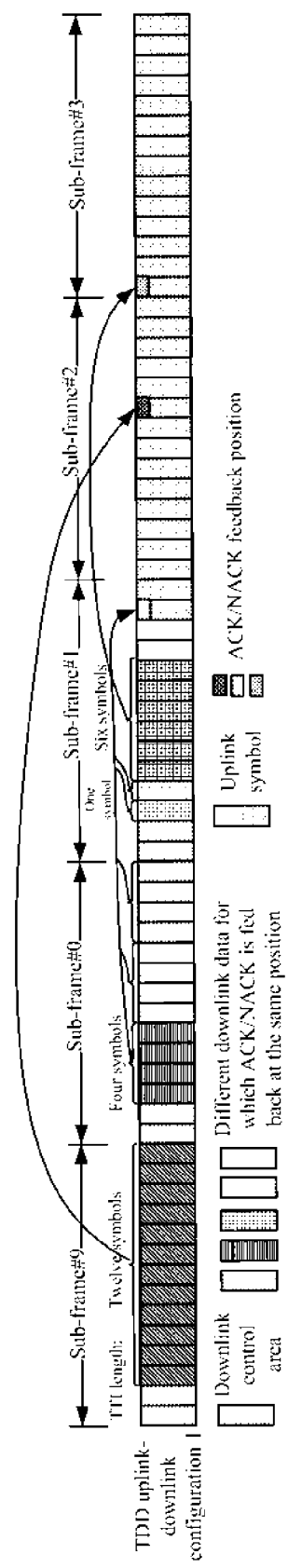
FIG. 4 is a second schematic feedback timing diagram of feedback information according to the embodiments of the application.

In a second embodiment (corresponding to the first scheme), as illustrated in FIG. 4, taking a TDD carrier with a normal CP and a TDD uplink-downlink configuration 1 as an example, for example, TDD special sub-frames are configured in the configuration 7 (that is, a DwPTS includes ten symbols, a GP includes two symbols, and a UpPTS includes two symbols), ACK/NACK can be fed back in each uplink sub-frame, k=3, and a time domain position for feeding back ACK/NACK thereof is determined directly according to a length of TTI of downlink transmission.

The length of TTI of the first downlink data transmission is twelve symbols, and the first downlink data transmission is transmitted in the third to fourteenth symbols in the sub-frame #9, so ACK/NACK can be fed back at earliest in the 37th symbol, which is an uplink symbol, after the last symbol occupied by the first downlink data transmission (or a symbol spaced from the last symbol by no less than 36 symbols), i.e., the ninth symbol in the sub-frame #2 in the next radio frame, as per the required delay of 12*3.

The length of TTI of the second downlink data transmission is four symbols, and the second downlink data transmission is transmitted in the third to sixth symbols in the sub-frame #0, so ACK/NACK can be fed back at earliest in the thirteenth symbol, which is not an uplink symbol, after the last symbol occupied by the second downlink data transmission (or a symbol spaced from the last symbol by no less than twelve symbols), as per the required delay of 4*3, so the ACK/NACK is delayed to and transmitted at a recent uplink symbol position, i.e., in the thirteenth symbol in the sub-frame #1.

The length of TTI of the third downlink data transmission is four symbols, and the third downlink data transmission is transmitted in the seventh to tenth symbols in the sub-frame #0, so ACK/NACK can be fed back at earliest in the thirteenth symbol, which is not an uplink symbol, after the last symbol occupied by the third downlink data transmission (or a symbol spaced from the last symbol by no less than twelve symbols), as per the required delay of 4*3, so the ACK/NACK is delayed to and transmitted at a recent uplink symbol position, i.e., in the thirteenth symbol in the sub-frame #1.

The length of TTI of the fourth downlink data transmission is four symbols, and the fourth downlink data transmission is transmitted in the eleventh to fourteenth symbols in the sub-frame #0, so ACK/NACK can be fed back at earliest in the thirteenth symbol, which is an uplink symbol, after the last symbol occupied by the fourth downlink data transmission (or a symbol spaced from the last symbol by no less than twelve symbols), i.e., the thirteenth symbol in the sub-frame #1, as per the required delay of 4*3.

The length of TTI of the fifth downlink data transmission is one symbol, and the fifth downlink data transmission is transmitted in the third symbol in the sub-frame #1, so ACK/NACK can be fed back at earliest in the fourth symbol, which is not an uplink symbol, after said symbol (or a symbol spaced from said symbol by no less than three symbols), as per the required delay of 1*3, so the ACK/NACK is delayed to and transmitted at a recent uplink symbol position, i.e., in the thirteenth symbol in the sub-frame #1.

The length of TTI of the sixth downlink data transmission is one symbol, and the sixth downlink data transmission is transmitted in the fourth symbol in the sub-frame #1, so ACK/NACK can be fed back at earliest in the fourth symbol, which is not an uplink symbol, after said symbol (or a symbol spaced from said symbol by no less than three symbols), as per the required delay of 1*3, so the ACK/NACK is delayed to and transmitted at a recent uplink symbol position, i.e., in the thirteenth symbol in the sub-frame #1.

The length of TTI of the seventh downlink data transmission is six symbols, and the seventh downlink data transmission is transmitted in the fifth to tenth symbols in the sub-frame #1, so ACK/NACK can be fed back at earliest in the nineteenth symbol, which is an uplink symbol, after the last symbol occupied by the seventh downlink data transmission (or a symbol spaced from the last symbol by no less than eighteen symbols), i.e., the first symbol in the sub-frame #3, as per the required delay of 6*3.

Figure 5:
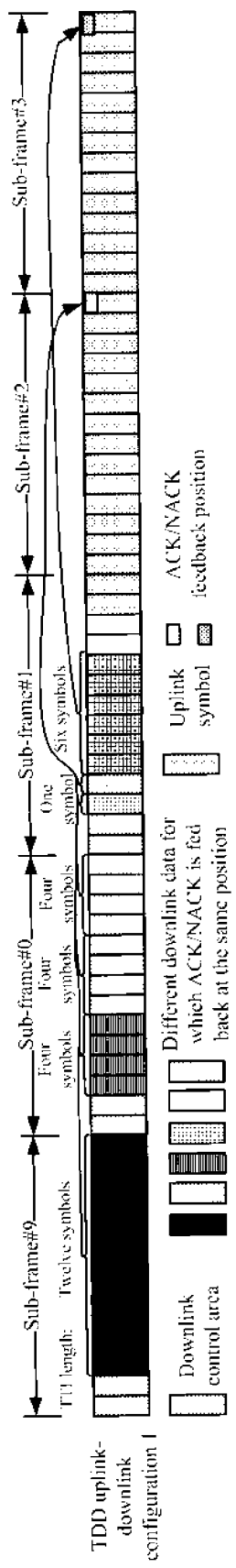
FIG. 5 is a third schematic feedback timing diagram of feedback information according to the embodiments of the application.

In a third embodiment (corresponding to the first scheme), as illustrated in FIG. 5, taking a TDD carrier with a normal CP and a TDD uplink-downlink configuration 1 as an example, for example, TDD special sub-frames are configured in the configuration 7 (that is, a DwPTS includes ten symbols, a GP includes two symbols, and a UpPTS includes two symbols), ACK/NACK can only be fed back in the last symbols in the sub-frames 2 and 3 in each radio frame, k=3, and a time domain position for feeding back ACK/NACK thereof is determined directly according to a length of TTI of downlink transmission.

The length of TTI of the first downlink data transmission is twelve symbols, and the first downlink data transmission is transmitted in the third to fourteenth symbols in the sub-frame #9, so ACK/NACK can be fed back at earliest in the 37th symbol, which is an uplink symbol but is not a specified symbol in which ACK/NACK can be transmitted, after the last symbol occupied by the first downlink data transmission (or a symbol spaced from the last symbol by no less than 36 symbols), as per the required delay of 12*3, so the ACK/NACK is delayed to and transmitted at a recent uplink symbol position at which ACK/NACK can be fed back, i.e., in the last symbol in the sub-frame #2 in the next radio frame.

The length of TTI of the second downlink data transmission is four symbols, and the second downlink data transmission is transmitted in the third to sixth symbols in the sub-frame #0, so ACK/NACK can be fed back at earliest in the thirteenth symbol, which is not an uplink symbol, after the last symbol occupied by the second downlink data transmission (or a symbol spaced from the last symbol by no less than twelve symbols), as per the required delay of 4*3, so the ACK/NACK is delayed to and transmitted at a recent uplink symbol position at which ACK/NACK can be fed back, i.e., in the last symbol in the sub-frame #2.

The length of TTI of the third downlink data transmission is four symbols, and the third downlink data transmission is transmitted in the seventh to tenth symbols in the sub-frame #0, so ACK/NACK can be fed back at earliest in the thirteenth symbol, which is not an uplink symbol, after the last symbol occupied by the third downlink data transmission (or a symbol spaced from the last symbol by no less than twelve symbols), as per the required delay of 4*3, so the ACK/NACK is delayed to and transmitted at a recent uplink symbol position at which ACK/NACK can be fed back, i.e., in the last symbol in the sub-frame #2.

The length of TTI of the fourth downlink data transmission is four symbols, and the fourth downlink data transmission is transmitted in the eleventh to fourteenth symbols in the sub-frame #0, so ACK/NACK can be fed back at earliest in the thirteenth symbol, which is an uplink symbol but is not a specified symbol in which ACK/NACK can be transmitted, after the last symbol occupied by the fourth downlink data transmission (or a symbol spaced from the last symbol by no less than twelve symbols), as per the required delay of 4*3, so the ACK/NACK is delayed to and transmitted at a recent uplink symbol position at which ACK/NACK can be fed back, i.e., in the last symbol in the sub-frame #2.

The length of TTI of the fifth downlink data transmission is one symbol, and the fifth downlink data transmission is transmitted in the third symbol in the sub-frame #1, so ACK/NACK can be fed back at earliest in the fourth symbol, which is not an uplink symbol, after said symbol (or a symbol spaced from said symbol by no less than three symbols), as per the required delay of 1*3, so the ACK/NACK is delayed to and transmitted at a recent uplink symbol position, i.e., in the last symbol in the sub-frame #2.

The length of TTI of the sixth downlink data transmission is one symbol, and the sixth downlink data transmission is transmitted in the fourth symbol in the sub-frame #1, so ACK/NACK can be fed back at earliest in the fourth symbol, which is not an uplink symbol, after said symbol (or a symbol spaced from said symbol by no less than three symbols), as per the required delay of 1*3, so the ACK/NACK is delayed to and transmitted at a recent uplink symbol position, i.e., in the last symbol in the sub-frame #2.

The length of TTI of the seventh downlink data transmission is six symbols, and the seventh downlink data transmission is transmitted in the fifth to tenth symbols in the sub-frame #1, so ACK/NACK can be fed back at earliest in the nineteenth symbol, which is an uplink symbol but is not a specified symbol in which ACK/NACK can be transmitted, after the last symbol occupied by the seventh downlink data transmission (or a symbol spaced from the last symbol by no less than eighteen symbols), as per the required delay of 6*3, so the ACK/NACK is delayed to and transmitted at a recent uplink symbol position at which ACK/NACK can be fed back, i.e., in the last symbol in the sub-frame #3.

Figure 6:
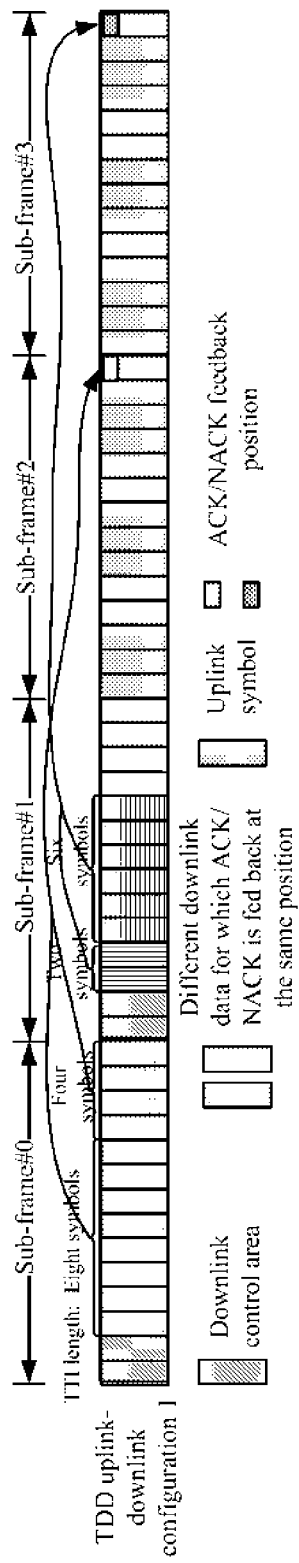
FIG. 6 is a fourth schematic feedback timing diagram of feedback information according to the embodiments of the application.

In a fourth embodiment (corresponding to the second scheme), as illustrated in FIG. 6, taking a TDD carrier with a normal CP and a TDD uplink-downlink configuration 1 as an example, for example, TDD special sub-frames are configured in the configuration 7 (that is, a DwPTS includes ten symbols, a GP includes two symbols, and a UpPTS includes two symbols), ACK/NACK can only be fed back in the last symbols in the sub-frames 2 and 3 in each radio frame, and k=3. In order to balance a load (of course, this embodiment can alternatively be implemented for another purpose of, for example, avoiding ACK/NACK resources of different terminals from conflicting with each other, etc.), in an implementation, it can be RRC-configured that a time domain position for feeding back ACK/NACK of each downlink transmission is determined according to a length of TTI, which is 8 (where a correspondence relationship between an RRC-configured indication field, and a configured length of TTI can be as depicted in Table 3 or the like; or furthermore it can also be configured in RRC signaling that the length of TTI for determining a time domain position for feeding back ACK/NACK is determined according to an offset relative to a length of TTI at which downlink transmission is scheduled, as depicted in Table 4 below or the like); and in another implementation, a first bit field in DCI of a control channel corresponding to each downlink transmission indicates a length of TTI for determining a time domain position for feeding back ACK/NACK of the downlink transmission.

The length of TTI of the first downlink data transmission is eight symbols, and the first downlink data transmission is transmitted in the third to tenth symbols in the sub-frame #0, if a feedback position is determined according to an RRC-configured length of TTI, which is eight symbols, then ACK/NACK may be fed back at earliest in the 25th symbol, which is an uplink symbol but is not a specified symbol in which ACK/NACK can be transmitted, after the last symbol occupied by the first downlink data transmission (or a symbol spaced from the last symbol by no less than 24 symbols), as per the required delay of 8*3, so the ACK/NACK is delayed to and transmitted at a recent uplink symbol position at which ACK/NACK can be fed back, i.e., in the last symbol in the sub-frame 2 in the current radio frame. And if a feedback position is determined according to a first indication field in DCI corresponding to the downlink transmission, then the first indication field will be obtained, and at this time, for example, the relationship indicated in the first indication field may be as depicted in Table 3. For example, if the first indication field in the DCI corresponding to the first downlink data transmission is "110", which indicates that a feedback position is determined according to a length of TTI, which is eight symbols, then ACK/NACK will be fed back as per the required delay of 8*3 as described above. Alternatively the relationship indicated in the first indication field may be as depicted in Table 4, and for example, if the first indication field in the DCI corresponding to the first downlink data transmission is "00", which indicates that a feedback position is determined according to a length of TTI, which is eight symbols, at which downlink transmission is really scheduled, then ACK/NACK will be fed back as per the required delay of 8*3 as described above (for Table 3 and Table 4, there may be other correspondence patterns, and for example, the values indicated in the tables may be changed, the units of the values indicated in the tables may be changed, the quantity of bits in the first indication field in the tables may be changed, the correspondence relationships between the respective states of the first indication field, and the indicated values in the tables may be swapped, etc., without departing from the claimed scope of the application).

TABLE 3

A correspondence relationship between the first indication field in DCI, and a length of TTI for determining a feedback position of ACK/NACK.

| The state of the first indication field | A length of TTI |
| --- | --- |
| 000 | 1 |
| 001 | 2 |
| 010 | 3 |
| 011 | 4 |
| 100 | 6 |
| 101 | 7 |
| 110 | 8 |
| 111 | 14 |

TABLE 4

A correspondence relationship between the first indication field in DCI, and an offset between a length of TTI for determining a feedback position of ACK/NACK and a length of TTI of downlink transmission.

| The state of the first indication field | Offset of a length of TTI (in symbols) |
| --- | --- |
| 00 | 0 |
| 01 | 2 |
| 10 | 4 |
| 11 | 6 |

The length of TTI of the second downlink data transmission is four symbols, and the second downlink data transmission is transmitted in the eleventh to fourteenth symbols in the sub-frame #0, if a feedback position is determined according to an RRC-configured length of TTI, which is eight symbols, then ACK/NACK may be fed back at earliest in the 25th symbol, which is an uplink symbol but is not a specified symbol in which ACK/NACK can be transmitted, after the last symbol occupied by the second downlink data transmission (or a symbol spaced from the last symbol by no less than 24 symbols), as per the required delay of 8*3, so the ACK/NACK is delayed to and transmitted at a recent uplink symbol position at which ACK/NACK can be fed back, i.e., in the last symbol in the sub-frame 2 in the current radio frame. And if a feedback position is determined according to a first indication field in DCI corresponding to the downlink transmission, then the first indication field will be obtained. For example, if the first indication field is "110", which indicates in the correspondence relationship in Table 3 that a feedback position is determined according to a length of TTI, which is eight symbols, and in another example, if the first indication field is "10", which indicates in the correspondence relationship in Table 4 that a feedback position is determined according to a length of TTI, which is eight symbols, determined by offsetting or increasing the length of TTI of the downlink transmission by four symbols, then ACK/NACK will be fed back as per the required delay of 8*3 as described above.

The length of TTI of the third downlink data transmission is two symbols, and the third downlink data transmission is transmitted in the third and fourth symbols in the sub-frame #1, if a feedback position is determined according to an RRC-configured length of TTI, which is eight symbols, then ACK/NACK may be fed back at earliest in the 25th symbol, which is an uplink symbol but is not a specified symbol in which ACK/NACK can be transmitted, after the last symbol occupied by the third downlink data transmission (or a symbol spaced from the last symbol by no less than 24 symbols), as per the required delay of 8*3, so the ACK/NACK is delayed to and transmitted at a recent uplink symbol position at which ACK/NACK can be fed back, i.e., in the last symbol in the sub-frame #3 in the current radio frame. And if a feedback position is determined according to a first indication field in DCI corresponding to the downlink transmission, then the first indication field will be obtained. For example, if the first indication field is "100", which indicates in the correspondence relationship in Table 3 that a feedback position is determined according to a length of TTI, which is six symbols, and in another example, if the first indication field is "10", which indicates in the correspondence relationship in Table 4 that a feedback position is determined according to a length of TTI, which is six symbols, determined by offsetting or increasing the length of TTI of the downlink transmission by four symbols, then ACK/NACK may be fed back at earliest in the nineteenth symbol, which is an uplink symbol but is not a specified symbol in which ACK/NACK can be transmitted, after the last symbol occupied by the third downlink data transmission (or a symbol spaced from the last symbol by no less than eighteen symbols), as per the required delay of 6*3, so the ACK/NACK is delayed to and transmitted at a recent uplink symbol position at which ACK/NACK can be fed back, i.e., in the last symbol in the sub-frame #3 in the current radio frame.

The length of TTI of the fourth downlink data transmission is six symbols, and the fourth downlink data transmission is transmitted in the fifth to tenth symbols in the sub-frame #1, if a feedback position is determined according to an RRC-configured length of TTI, which is eight symbols, then ACK/NACK may be fed back at earliest in the 25th symbol, which is an uplink symbol but is not a specified symbol in which ACK/NACK can be transmitted, after the last symbol occupied by the fourth downlink data transmission (or a symbol spaced from the last symbol by no less than 24 symbols), as per the required delay of 8*3, so the ACK/NACK is delayed to and transmitted at a recent uplink symbol position at which ACK/NACK can be fed back, i.e., in the last symbol in the sub-frame #3 in the current radio frame. And if a feedback position is determined according to a first indication field in DCI corresponding to the downlink transmission, then the first indication field will be obtained. For example, if the first indication field is "100", which indicates in the correspondence relationship in Table 3 that a feedback position is determined according to a length of TTI, which is six symbols, and in another example, if the first indication field is "00", which indicates in the correspondence relationship in Table 4 that a feedback position is determined according to a length of TTI, which is six symbols, at which downlink transmission is really scheduled, then ACK/NACK may be fed back at earliest in the nineteenth symbol, which is an uplink symbol but is not a specified symbol in which ACK/NACK can be transmitted, after the last symbol occupied by the fourth downlink data transmission (or a symbol spaced from the last symbol by no less than eighteen symbols), as per the required delay of 6*3, so the ACK/NACK is delayed to and transmitted at a recent uplink symbol position at which ACK/NACK can be fed back, i.e., in the last symbol in the sub-frame #3 in the current radio frame.

It shall be noted that the operations in the third scheme are substantially the same as the second scheme in the fourth embodiment except that before the time domain position for feeding back the ACK/NACK is determined, the length of TTI for determining the time domain position for feeding back the ACK/NACK is determined according to the length of TTI at which downlink transmission is really scheduled, and the configured length of TTI, e.g., the larger one of them, and then the time domain position for feeding back the ACK/NACK is determined as in the operations above, thus a repeated description thereof will be omitted here.

Figure 7:
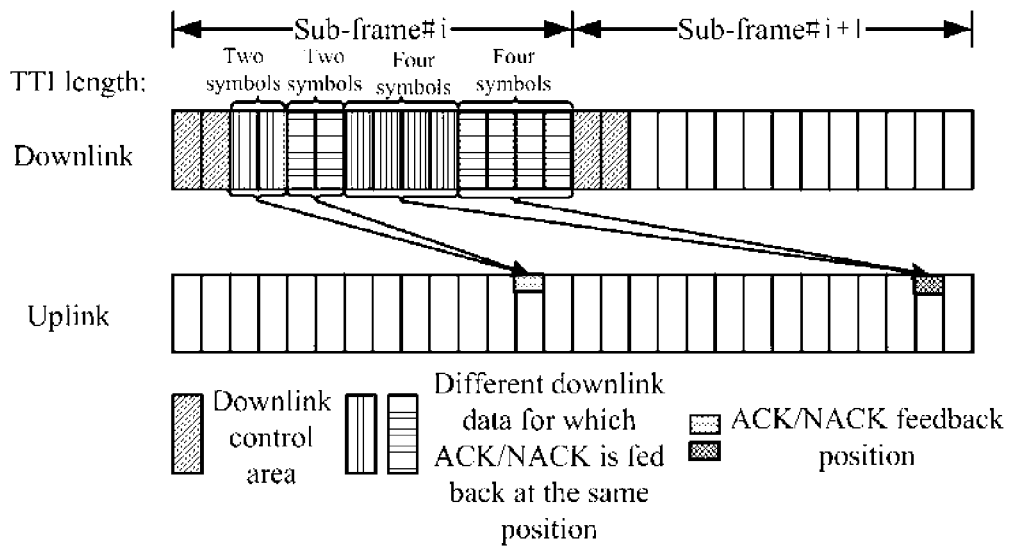
FIG. 7 is a fifth schematic feedback timing diagram of feedback information according to the embodiments of the application.

In a fifth embodiment (corresponding to the fourth scheme), as illustrated in FIG. 7, taking an FDD carrier with a normal CP as an example, for example, k=3, ACK/NACK can be fed back in each uplink symbol, and a time domain position for feeding back ACK/NACK of downlink transmission is determined according to a length of TTI of the downlink transmission, and a feedback delay indication field in RRC signaling or DCI, where the feedback delay indication field indicates a correspondence relationship as depicted in Table 5 (there may be other correspondence patterns, and for example, the values indicated in the table may be changed, the unit of the values indicated in the table may be changed, the quantity of bits in the indication field in the table may be changed, the correspondence relationship between the respective states of the indication field, and the indicated values in the table may be swapped, etc., without departing from the claimed scope of the application).

TABLE 5

A correspondence relationship between a feedback delay indication field and what it indicates.

| The state of the feedback delay indication field | Delay (in ACK/NACK resources) |
| --- | --- |
| 00 | 0 |
| 01 | 1 |
| 10 | 2 |
| 11 | 4 |

The length of TTI of the first downlink data transmission is two symbols, and the first downlink data transmission is transmitted in the third and fourth symbols in the sub-frame #i, so ACK/NACK may be fed back at earliest in the seventh symbol after the last symbol occupied by the first downlink data transmission (or a symbol spaced from the last symbol by no less than six symbols), that is, the ACK/NACK may be transmitted in the eleventh symbol (uplink) in the sub-frame, as per the required delay of 2*3, but the feedback delay indication field in the DCI is "10", which indicates a delay of two ACK/NACK feedback resources, so it is determined to transmit the ACK/NACK in the thirteenth symbol (uplink) in the sub-frame.

The length of TTI of the second downlink data transmission is two symbols, and the second downlink data transmission is transmitted in the fifth and sixth symbols in the sub-frame # i, so ACK/NACK may be fed back at earliest in the seventh symbol after the last symbol occupied by the second downlink data transmission (or a symbol spaced from the last symbol by no less than six symbols), that is, the ACK/NACK may be transmitted in the thirteenth symbol (uplink) in the sub-frame, as per the required delay of 2*3, and the feedback delay indication field in the DCI is "00", which indicates no delay, so it is determined to transmit the ACK/NACK in the thirteenth symbol (uplink) in the sub-frame.

The length of TTI of the third downlink data transmission is four symbols, and the third downlink data transmission is transmitted in the seventh to tenth symbols in the sub-frame # i, so ACK/NACK may be fed back at earliest in the thirteenth symbol after the last symbol occupied by the third downlink data transmission (or a symbol spaced from the last symbol by no less than twelve symbols), that is, the ACK/NACK may be transmitted in the ninth symbol (uplink) in the sub-frame # i+1, as per the required delay of 4*3, but the feedback delay indication field in the DCI is "11", which indicates a delay of four ACK/NACK feedback resources, so it is determined to transmit the ACK/NACK in the thirteenth symbol (uplink) in the sub-frame # i+1.

The length of TTI of the fourth downlink data transmission is four symbols, and the fourth downlink data transmission is transmitted in the eleventh to fourteenth symbols in the sub-frame # i, so ACK/NACK may be fed back at earliest in the thirteenth symbol after the last symbol occupied by the fourth downlink data transmission (or a symbol spaced from the last symbol by no less than twelve symbols), that is, the ACK/NACK may be transmitted in the thirteenth symbol (uplink) in the sub-frame # i+1, as per the required delay of 4*3, and the feedback delay indication field in the DCI is "00", which indicates no delay, so it is determined to transmit the ACK/NACK in the thirteenth symbol (uplink) in the sub-frame # i+1.

It shall be noted that the ACK/NACK feedback is transmitted in only one symbol as described in the embodiments above by way of an example, but the ACK/NACK can alternatively be transmitted in more than one symbol, e.g., 2, 3, 4, 5, 7, etc., symbols, or in 1 ms (12 or 14 symbols), and at this time, the position of a start symbol in which the ACK/NACK is transmitted can be determined as described above except that a candidate start symbol position is a specific symbol position, satisfying A consecutive uplink symbols, determined according to the quantity A of symbols for transmitting the ACK/NACK, and the ACK/NACK is transmitted in a plurality of consecutive symbols starting with the symbol position. And only one carrier has been described in the embodiments above by way of an example, but when carriers are aggregated, the same description will apply to each carrier except that for an SCC, carriers over which ACK/NACK can be fed back shall be searched for a first available uplink transmission resource as per the required delay above, and the time domain position for transmitting the ACK/NACK feedback information can be preliminarily determined in the fourth scheme as described in the first, second, and third schemes above.

In the respective embodiments above, the configured length of TTI is replaced with a predefined length of TTI, e.g., the length of an elementary short TTI, e.g., a short TTI of one symbol, or a short TTI of two symbols; and the time domain position for transmitting the ACK/NACK feedback information is determined as described above, thus a repeated description thereof will be omitted here.

Devices corresponding to the methods above will be introduced below.

Figure 8:
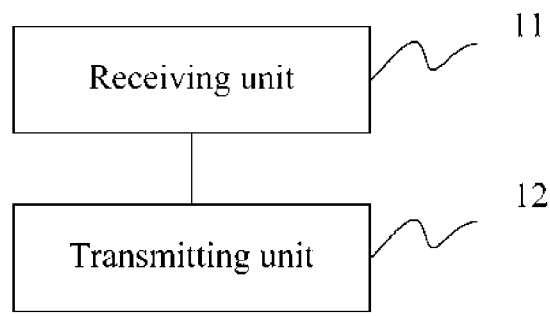
FIG. 8 is a schematic structural diagram of a device for transmitting feedback information according to the embodiments of the application.

Referring to FIG. 8, a device for transmitting feedback information according to the embodiments of the application includes: a receiving unit 11 configured to receive downlink transmission; and a transmitting unit 12 configured to determine an uplink time domain resource position for transmitting ACK/NACK feedback information of the downlink transmission, according to at least a length of TTI of the downlink transmission and/or a second length of TTI, and to transmit the ACK/NACK feedback information of the downlink transmission at the uplink time domain resource position, where the second length of TTI is a length of TTI, configured by configuration signaling or predefined, for determining an uplink time domain resource position for transmitting ACK/NACK feedback information.

Optionally the transmitting unit is configured to determine the uplink time domain resource position for transmitting the ACK/NACK feedback information of the downlink transmission, according to the length of TTI of the downlink transmission, and to transmit the ACK/NACK feedback information of the downlink transmission at the uplink time domain resource position as follows.

Determine to transmit the ACK/NACK feedback information of the downlink transmission over a first uplink time domain resource that can be used to transmit ACK/NACK and satisfies a time length $L1*k$ or $L2*k$ symbols, after an end time position or an end symbol position of the downlink transmission.

Or, determine to transmit the ACK/NACK feedback information of the downlink transmission over a first uplink time domain resource that can be used to transmit ACK/NACK and is no earlier than a time length $L1*k$ or $L2*k$ symbols, after an end time position or an end symbol position of the downlink transmission.

Or, determine to transmit the ACK/NACK feedback information of the downlink transmission over a first uplink time domain resource that can be used to transmit ACK/NACK after a TTI with the index n+k, where TTIs are numbered as per the length of TTI of the downlink transmission, and the index of TTI of the downlink transmission is n.

Or, determine to transmit the ACK/NACK feedback information of the downlink transmission over a first uplink time domain resource that can be used to transmit ACK/NACK and is spaced from an end time position or an end symbol position of the downlink transmission by no less than a time length $L1*k$ or $L2*k$ symbols.

Where L1 is the length of TTI of the downlink transmission in a unit of time, L2 is the length of TTI of the downlink transmission in a unit of symbol, and k is a predefined or preconfigured positive integer or decimal fraction.

Optionally the transmitting unit is configured to determine the uplink time domain resource position for transmitting the ACK/NACK feedback information of the downlink transmission, according to the length of TTI of the downlink transmission and/or the second length of TTI, and to transmit the ACK/NACK feedback information of the downlink transmission at the uplink time domain resource position as follows.

Determine to transmit the ACK/NACK feedback information of the downlink transmission over a first uplink time domain resource that can be used to transmit ACK/NACK and satisfies a time length $L3*k$ or $L4*k$ symbols, after an end time position or an end symbol position of the downlink transmission, wherein the end time position or the end symbol position of the downlink transmission is determined according to a first length of TTI.

Or, determine to transmit the ACK/NACK feedback information of the downlink transmission over a first uplink time domain resource that can be used to transmit ACK/NACK and is no earlier than a time length L3*k or L4*k symbols, after an end time position or an end symbol position of the downlink transmission, wherein the end time position or the end symbol position of the downlink transmission is determined according to a first length of TTI.

Or, determine to transmit the ACK/NACK feedback information of the downlink transmission over a first uplink time domain resource that can be used to transmit ACK/NACK after a TTI with the index n+k, where TTIs are numbered as per a first length of TTI, and the index of TTI of the downlink transmission is n.

Or, determine to transmit the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols, wherein the end time position or the end symbol position of the downlink transmission is determined according to a first length of TTI.

Or, determine to transmit the ACK/NACK feedback information of the downlink transmission over a first uplink time domain resource that can be used to transmit ACK/NACK and satisfies a time length L3*k or L4*k symbols, after an end time position or an end symbol position of the downlink transmission.

Or, determine to transmit the ACK/NACK feedback information of the downlink transmission over a first uplink time domain resource that can be used to transmit ACK/NACK and is no earlier than a time length L3*k or L4*k symbols, after an end time position or an end symbol position of the downlink transmission.

Or, determine to transmit the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols.

Where L3 is the first length of TTI in a unit of time, L4 is the first length of TTI in a unit of symbol, and k is a predefined or preconfigured positive integer or decimal fraction; and the first length of TTI is the second length of TTI, or the larger one or the smaller one or the average of the second length of TTI and the length of TTI of the downlink transmission.

Optionally the transmitting unit is configured to determine the uplink time domain resource position for transmitting the ACK/NACK feedback information of the downlink transmission, according to at least the length of TTI of the downlink transmission and/or the second length of TTI as follows.

Determine the uplink time domain resource position for transmitting the ACK/NACK feedback information of the downlink transmission, according to the length of TTI of the downlink transmission and/or the second length of TTI, and a feedback delay configured by the configuration signaling.

Optionally the transmitting unit is configured to determine the uplink time domain resource position for transmitting the ACK/NACK feedback information of the downlink transmission, according to the length of TTI of the downlink transmission and/or the second length of TTI, and the feedback delay configured by the configuration signaling as follows.

Determine preliminarily an uplink time domain resource position for transmitting the ACK/NACK feedback information of the downlink transmission, according to the length of TTI of the downlink transmission and/or the second length of TTI.

Delay the preliminarily determined uplink time domain resource position for transmitting the ACK/NACK feedback information of the downlink transmission, according to the feedback delay configured by the configuration signaling, and determine the delayed uplink time domain resource position as a final uplink time domain resource position for transmitting the ACK/NACK feedback information of the downlink transmission.

Optionally the configuration signaling is higher-layer signaling, or the configuration signaling is carried in a first physical downlink control channel corresponding to the downlink transmission; and/or the configuration signaling configures the same second length of TTI or different second lengths of TTI for downlink transmission with different lengths of TTI.

Optionally the configuration signaling configures the second length of TTI as follows.

The configuration signaling indicates one of lengths of TTI in a predefined or preconfigured set of lengths of TTI for determining the uplink time domain resource position for transmitting the ACK/NACK feedback information of the downlink transmission as the second length of TTI; or the configuration signaling indicates an offset between the second length of TTI and the length of TTI of the downlink transmission.

Optionally the uplink time domain resource that can be used to transmit ACK/NACK (i.e. over which ACK/NACK can be transmitted) includes following resources.

A part or all of uplink sub-frames.

Or, a part or all of sub-frames including at least one symbol for uplink transmission.

Or, a part or all of sub-frames including such a quantity of consecutive symbols for uplink transmission that is no less than a preset number.

Or, a part or all of symbols or TTIs for uplink transmission.

Or, a part or all of symbols or TTIs in a part or all of uplink sub-frames.

Or, A symbols or B TTIs in a part or all of uplink sub-frames, where A is the quantity of symbols to be occupied for transmitting the ACK/NACK feedback information, and A is a positive integer; and B is the quantity of TTIs to be occupied for transmitting the ACK/NACK feedback information, and B is a positive integer.

Or, a part or all of symbols or TTIs for uplink transmission in a part or all of sub-frames for uplink transmission including at least one symbol for uplink transmission.

Or, A symbols or B TTIs in a part or all of sub-frames including at least one symbol for uplink transmission.

Or, a part or all of symbols or TTIs for uplink transmission in a part or all of sub-frames including such a quantity of consecutive symbols for uplink transmission that is no less than a preset number.

Or, A symbols or B TTIs in a part or all of sub-frames including such a quantity of consecutive symbols for uplink transmission that is no less than a preset number.

Optionally when the transmitting unit determines to transmit ACK/NACK feedback information of a plurality of instances of the downlink transmission at the same uplink time domain resource, the transmitting unit is configured: to concatenate the ACK/NACK feedback information corresponding respectively to the plurality of instances of the downlink transmission according to DAI indication fields in DCI of first physical downlink control channels corresponding respectively to the plurality of instances of the downlink transmission, and to transmit the concatenated ACK/NACK feedback information at the uplink time domain resource position.

Optionally the downlink transmission is a first physical downlink control channel indicating a downlink SPS resource release, or a first physical downlink shared channel with a corresponding first physical downlink control channel, or a first physical downlink shared channel without a corresponding first physical downlink control channel.

Optionally the second length of TTI is an elementary short length of TTI, and the elementary short length of TTI is an elementary transmission unit in the time domain; or the second length of TTI is one of a plurality of system supported lengths of TTI.

Figure 9:
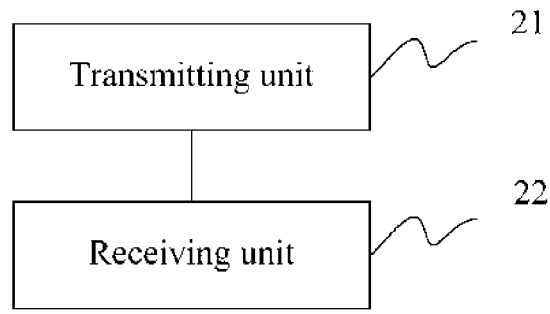
FIG. 9 is a schematic structural diagram of a device for receiving feedback information according to the embodiments of the application.

Referring to FIG. 9, a device for receiving feedback information according to the embodiments of the application includes: a transmitting unit 21 configured to transmit downlink transmission; and a receiving unit 22 configured to determine an uplink time domain resource position for transmitting ACK/NACK feedback information of the downlink transmission, according to at least a length of TTI of the downlink transmission and/or a second length of TTI, and to receive the ACK/NACK feedback information of the downlink transmission at the uplink time domain resource position, where the second length of TTI is a length of TTI, configured by configuration signaling or predefined, for determining an uplink time domain resource position for transmitting ACK/NACK feedback information.

Optionally the receiving unit is configured to determine the uplink time domain resource position for transmitting the ACK/NACK feedback information of the downlink transmission, according to the length of TTI of the downlink transmission, and to receive the ACK/NACK feedback information of the downlink transmission at the uplink time domain resource position as follows.

Determine to receive the ACK/NACK feedback information of the downlink transmission over a first uplink time domain resource that can be used to transmit ACK/NACK and satisfies a time length $L1*k$ or $L2*k$ symbols, after an end time position or an end symbol position of the downlink transmission.

Or, determine to receive the ACK/NACK feedback information of the downlink transmission over a first uplink time domain resource that can be used to transmit ACK/NACK and is no earlier than a time length $L1*k$ or $L2*k$ symbols, after an end time position or an end symbol position of the downlink transmission.

Or, determine to receive the ACK/NACK feedback information of the downlink transmission over a first uplink time domain resource that can be used to transmit ACK/NACK after a TTI with the index n+k, where TTIs are numbered as per the length of TTI of the downlink transmission, and the index of TTI of the downlink transmission is n.

Or, determine to receive the ACK/NACK feedback information of the downlink transmission over a first uplink time domain resource that can be used to transmit ACK/NACK and is spaced from an end time position or an end symbol position of the downlink transmission by no less than a time length $L1*k$ or $L2*k$ symbols.

Where L1 is the length of TTI of the downlink transmission in a unit of time, L2 is the length of TTI of the downlink transmission in a unit of symbol, and k is a predefined or preconfigured positive integer or decimal fraction.

Optionally the receiving unit is configured to determine the uplink time domain resource position for transmitting the ACK/NACK feedback information of the downlink transmission, according to the length of TTI of the downlink transmission and/or the second length of TTI, and to receive the ACK/NACK feedback information of the downlink transmission at the uplink time domain resource position as follows.

Determine to receive the ACK/NACK feedback information of the downlink transmission over a first uplink time domain resource that can be used to transmit ACK/NACK and satisfies a time length $L3*k$ or $L4*k$ symbols, after an end time position or an end symbol position of the downlink transmission, wherein the end time position or the end symbol position of the downlink transmission is determined according to a first length of TTI.

Or, determine to receive the ACK/NACK feedback information of the downlink transmission over a first uplink time domain resource that can be used to transmit ACK/NACK and is no earlier than a time length $L3*k$ or $L4*k$ symbols, after an end time position or an end symbol position of the downlink transmission, wherein the end time position or the end symbol position of the downlink transmission is determined according to a first length of TTI.

Or, determine to receive the ACK/NACK feedback information of the downlink transmission over a first uplink time domain resource that can be used to transmit ACK/NACK after a TTI with the index n+k, where TTIs are numbered as per a first length of TTI, and the index of TTI of the downlink transmission is n.

Or, determine to receive the ACK/NACK feedback information of the downlink transmission over a first uplink time domain resource that can be used to transmit ACK/NACK and is spaced from an end time position or an end symbol position of the downlink transmission by no less than a time length $L3*k$ or $L4*k$ symbols, wherein the end time position or the end symbol position of the downlink transmission is determined according to a first length of TTI.

Or, determine to receive the ACK/NACK feedback information of the downlink transmission over a first uplink time domain resource that can be used to transmit ACK/NACK and satisfies a time length $L3*k$ or $L4*k$ symbols, after an end time position or an end symbol position of the downlink transmission.

Or, determine to receive the ACK/NACK feedback information of the downlink transmission over a first uplink time domain resource that can be used to transmit ACK/NACK and is no earlier than a time length $L3*k$ or $L4*k$ symbols, after an end time position or an end symbol position of the downlink transmission.

Or, determine to receive the ACK/NACK feedback information of the downlink transmission over a first uplink time domain resource that can be used to transmit ACK/NACK and is spaced from an end time position or an end symbol position of the downlink transmission by no less than a time length $L3*k$ or $L4*k$ symbols.

Where L3 is the first length of TTI in a unit of time, L4 is the first length of TTI in a unit of symbol, and k is a predefined or preconfigured positive integer or decimal fraction; and the first length of TTI is the second length of TTI, or the first length of TTI is the larger or smaller one or the average of the second length of TTI and the length of TTI of the downlink transmission.

Optionally the receiving unit is configured to determine the uplink time domain resource position for transmitting the ACK/NACK feedback information of the downlink transmission, according to at least the length of TTI of the downlink transmission and/or the second length of TTI as follows.

Determine the uplink time domain resource position for transmitting the ACK/NACK feedback information of the downlink transmission, according to the length of TTI of the downlink transmission and/or the second length of TTI, and a feedback delay configured by the configuration signaling.

Optionally the receiving unit is configured to determine the uplink time domain resource position for transmitting the ACK/NACK feedback information of the downlink transmission, according to the length of TTI of the downlink transmission and/or the second length of TTI, and the feedback delay configured by the configuration signaling as follows.

Determine preliminarily an uplink time domain resource position for transmitting the ACK/NACK feedback information of the downlink transmission, according to the length of TTI of the downlink transmission and/or the second length of TTI.

Delay the preliminarily determined uplink time domain resource position for transmitting the ACK/NACK feedback information of the downlink transmission, according to the feedback delay configured by the configuration signaling, and determine the delayed uplink time domain resource position as a final uplink time domain resource position for transmitting the ACK/NACK feedback information of the downlink transmission.

Optionally the configuration signaling is higher-layer signaling, or the configuration signaling is carried in a first physical downlink control channel corresponding to the downlink transmission; and/or the configuration signaling configures the same second length of TTI or different second lengths of TTI for downlink transmission with different lengths of TTI.

Optionally the configuration signaling configures the second length of TTI as follows.

The configuration signaling indicates one of lengths of TTI in a predefined or preconfigured set of lengths of TTI for determining the uplink time domain resource position for transmitting the ACK/NACK feedback information of the downlink transmission as the second length of TTI; or the configuration signaling indicates an offset between the second length of TTI and the length of TTI of the downlink transmission.

Optionally the uplink time domain resource over which ACK/NACK can be transmitted includes following resources.

A part or all of uplink sub-frames.

Or, a part or all of sub-frames including at least one symbol for uplink transmission.

Or, a part or all of sub-frames including such a quantity of consecutive symbols for uplink transmission that is no less than a preset number.

Or, a part or all of symbols or TTIs for uplink transmission.

Or, a part or all of symbols or TTIs in a part or all of uplink sub-frames.

Or, A symbols or B TTIs in a part or all of uplink sub-frames, where A is the quantity of symbols to be occupied for transmitting the ACK/NACK feedback information, and A is a positive integer; and B is the quantity of TTIs to be occupied for transmitting the ACK/NACK feedback information, and B is a positive integer.

Or, a part or all of symbols or TTIs for uplink transmission in a part or all of sub-frames for uplink transmission including at least one symbol for uplink transmission.

Or, A symbols or B TTIs in a part or all of sub-frames including at least one symbol for uplink transmission.

Or, a part or all of symbols or TTIs for uplink transmission in a part or all of sub-frames including such a quantity of consecutive symbols for uplink transmission that is no less than a preset number.

Or, A symbols or B TTIs in a part or all of sub-frames including such a quantity of consecutive symbols for uplink transmission that is no less than a preset number.

Optionally when the receiving unit determines that ACK/NACK feedback information of a plurality of instances of the downlink transmission is transmitted at the same uplink time domain resource, the receiving unit is configured to determine that the ACK/NACK feedback information is obtained by concatenating the ACK/NACK feedback information corresponding respectively to the plurality of instances of the downlink transmission according to DAI indication fields in DCI of first physical downlink control channels corresponding respectively to the plurality of instances of the downlink transmission.

Optionally the downlink transmission is a first physical downlink control channel indicating a downlink SPS resource release, or a first physical downlink shared channel with a corresponding first physical downlink control channel, or a first physical downlink shared channel without a corresponding first physical downlink control channel.

Optionally the second length of TTI is an elementary short length of TTI, and the elementary short length of TTI is an elementary transmission unit in the time domain; or the second length of TTI is one of a plurality of system supported lengths of TTI.

Figure 10:
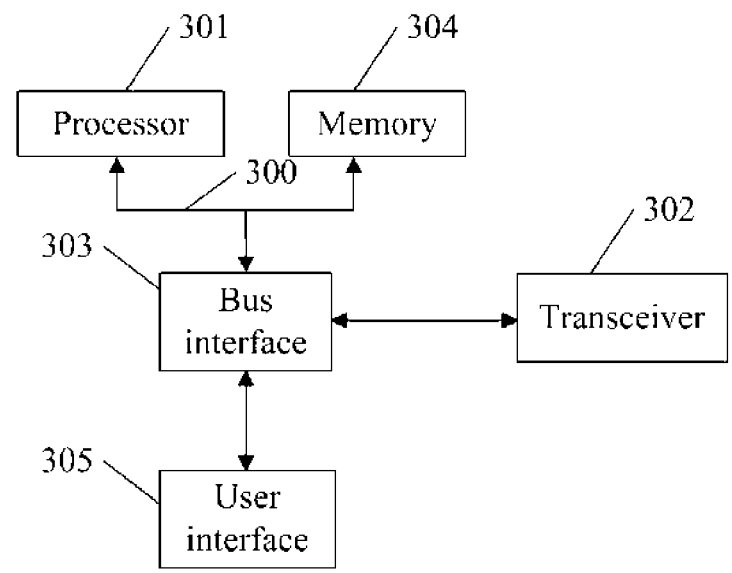
FIG. 10 is a schematic structural diagram of another device for transmitting feedback information according to the embodiments of the application.

Referring to FIG. 10, another device for transmitting feedback information according to the embodiments of the application includes a processor 301 configured to read and execute programs in a memory 304 to: receive downlink transmission through a transceiver 302; and determine an uplink time domain resource position for transmitting ACK/NACK feedback information of the downlink transmission, according to at least a length of TTI of the downlink transmission and/or a second length of TTI, and transmit the ACK/NACK feedback information of the downlink transmission at the uplink time domain resource position through the transceiver 302, where the second length of TTI is a length of TTI, configured by configuration signaling or predefined, for determining an uplink time domain resource position for transmitting ACK/NACK feedback information.

Optionally the processor 301 is configured to determine the uplink time domain resource position for transmitting the ACK/NACK feedback information of the downlink transmission, according to the length of TTI of the downlink transmission, and to transmit the ACK/NACK feedback information of the downlink transmission at the uplink time domain resource position as follows.

Determine to transmit the ACK/NACK feedback information of the downlink transmission over a first uplink time domain resource that can be used to transmit ACK/NACK and satisfies a time length L1*k or L2*k symbols, after an end time position or an end symbol position of the downlink transmission.

Or, determine to transmit the ACK/NACK feedback information of the downlink transmission over a first uplink time domain resource that can be used to transmit ACK/NACK and is no earlier than a time length L1*k or L2*k symbols, after an end time position or an end symbol position of the downlink transmission.

Or, determine to transmit the ACK/NACK feedback information of the downlink transmission over a first uplink time domain resource that can be used to transmit ACK/NACK after a TTI with the index n+k, where TTIs are numbered as per the length of TTI of the downlink transmission, and the index of TTI of the downlink transmission is n.

Or, determine to transmit the ACK/NACK feedback information of the downlink transmission over a first uplink time domain resource that can be used to transmit ACK/NACK and is spaced from an end time position or an end symbol position of the downlink transmission by no less than a time length L1*k or L2*k symbols.

Where L1 is the length of TTI of the downlink transmission in a unit of time, L2 is the length of TTI of the downlink transmission in a unit of symbol, and k is a predefined or preconfigured positive integer or decimal fraction.

Optionally the processor 301 is configured to determine the uplink time domain resource position for transmitting the ACK/NACK feedback information of the downlink transmission, according to the length of TTI of the downlink transmission and/or the second length of TTI, and to transmit the ACK/NACK feedback information of the downlink transmission at the uplink time domain resource position as follows.

Determine to transmit the ACK/NACK feedback information of the downlink transmission over a first uplink time domain resource that can be used to transmit ACK/NACK and satisfies a time length L3*k, or L4*k symbols, after an end time position or an end symbol position of the downlink transmission, wherein the end time position or the end symbol position of the downlink transmission is determined according to a first length of TTI.

Or, determine to transmit the ACK/NACK feedback information of the downlink transmission over a first uplink time domain resource that can be used to transmit ACK/NACK and is no earlier than a time length L3*k or L4*k symbols, after an end time position or an end symbol position of the downlink transmission, wherein the end time position or the end symbol position of the downlink transmission is determined according to a first length of TTI.

Or, determine to transmit the ACK/NACK feedback information of the downlink transmission over a first uplink time domain resource that can be used to transmit ACK/NACK after a TTI with the index n+k, where TTIs are numbered as per a first length of TTI, and the index of TTI of the downlink transmission is n.

Or, determine to transmit the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols, wherein the end time position or the end symbol position of the downlink transmission is determined according to a first length of TTI.

Or, determine to transmit the ACK/NACK feedback information of the downlink transmission over a first uplink time domain resource that can be used to transmit ACK/NACK and satisfies a time length L3*k or L4*k symbols, after an end time position or an end symbol position of the downlink transmission.

Or, determine to transmit the ACK/NACK feedback information of the downlink transmission over a first uplink time domain resource that can be used to transmit ACK/NACK and is no earlier than a time length L3*k or L4*k symbols, after an end time position or an end symbol position of the downlink transmission.

Or, determine to transmit the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols.

Where L3 is the first length of TTI in a unit of time, L4 is the first length of TTI in a unit of symbol, and k is a predefined or preconfigured positive integer or decimal fraction; and the first length of TTI is the second length of TTI, or the larger or smaller one or the average of the second length of TTI and the length of TTI of the downlink transmission.

Optionally the processor 301 is configured to determine the uplink time domain resource position for transmitting the ACK/NACK feedback information of the downlink transmission, according to at least the length of TTI of the downlink transmission and/or the second length of TTI as follows.

Determine the uplink time domain resource position for transmitting the ACK/NACK feedback information of the downlink transmission, according to the length of TTI of the downlink transmission and/or the second length of TTI, and a feedback delay configured by the configuration signaling.

Optionally the processor 301 is configured to determine the uplink time domain resource position for transmitting the ACK/NACK feedback information of the downlink transmission, according to the length of TTI of the downlink transmission and/or the second length of TTI, and the feedback delay configured by the configuration signaling as follows.

Determine preliminarily the uplink time domain resource position for transmitting the ACK/NACK feedback information of the downlink transmission according to the length of TTI of the downlink transmission and/or the second length of TTI.

Delay the preliminarily determined uplink time domain resource position for transmitting the ACK/NACK feedback information of the downlink transmission, according to the feedback delay configured by the configuration signaling, and determine the delayed uplink time domain resource position as the uplink time domain resource position for transmitting the ACK/NACK feedback information of the downlink transmission.

Optionally the configuration signaling is higher-layer signaling, or the configuration signaling is carried in a first physical downlink control channel corresponding to the downlink transmission; and/or the configuration signaling configures the same second length of TTI or different second lengths of TTI for downlink transmission with different lengths of TTI.

Optionally the configuration signaling configures the second length of TTI as follows.

The configuration signaling indicates one of lengths of TTI in a predefined or preconfigured set of lengths of TTI for determining an uplink time domain resource position for transmitting ACK/NACK feedback information of the downlink transmission as the second length of TTI; or the configuration signaling indicates an offset between the second length of TTI and the length of TTI of the downlink transmission.

Optionally the uplink time domain resource over which ACK/NACK can be transmitted includes following resources.

A part or all of uplink sub-frames.

Or, a part or all of sub-frames including at least one symbol for uplink transmission.

Or, a part or all of sub-frames including such a quantity of consecutive symbols for uplink transmission that is no less than a preset number.

Or, a part or all of symbols or TTIs for uplink transmission.

Or, a part or all of symbols or TTIs in a part or all of uplink sub-frames.

Or, A symbols or B TTIs in a part or all of uplink sub-frames, where A is the quantity of symbols to be occupied for transmitting the ACK/NACK feedback information, and A is a positive integer; and B is the quantity of TTIs to be occupied for transmitting the ACK/NACK feedback information, and B is a positive integer.

Or, a part or all of symbols or TTIs for uplink transmission in a part or all of sub-frames for uplink transmission including at least one symbol for uplink transmission.

Or, A symbols or B TTIs in a part or all of sub-frames including at least one symbol for uplink transmission.

Or, a part or all of symbols or TTIs for uplink transmission in a part or all of sub-frames including such a quantity of consecutive symbols for uplink transmission that is no less than a preset number.

Or, A symbols or B TTIs in a part or all of sub-frames including such a quantity of consecutive symbols for uplink transmission that is no less than a preset number.

Optionally when the processor 301 determines to transmit ACK/NACK feedback information of a plurality of instances of the downlink transmission at the same uplink time domain resource, the processor is configured: to concatenate the ACK/NACK feedback information corresponding respectively to the plurality of instances of the downlink transmission according to DAI indication fields in DCI of first physical downlink control channels corresponding respectively to the plurality of instances of the downlink transmission, and to transmit the concatenated ACK/NACK feedback information at the uplink time domain resource position.

Optionally the downlink transmission is a first physical downlink control channel indicating a downlink SPS resource release, or a first physical downlink shared channel with a corresponding first physical downlink control channel, or a first physical downlink shared channel without a corresponding first physical downlink control channel.

Optionally the second length of TTI is an elementary short length of TTI, and the elementary short length of TTI is an elementary transmission unit in the time domain; or the second length of TTI is one of a plurality of system supported lengths of TTI.

The transceiver 302 is configured to receive and transmit data under the control of the processor 301.

In FIG. 10, in the bus architecture (represented as a bus 300), the bus 300 can include any quantity of interconnecting buses and bridges to particularly link together various circuits including one or more processors represented by the processor 301, and one or more memories represented by the memory 304. The bus 300 can further link together various other circuits, e.g., a peripheral device, a manostat, a power management circuit, etc., all of which are well known in the art, so a further description thereof will be omitted in this context. A bus interface 303 serves as an interface between the bus 300 and the transceiver 302. The transceiver 302 can be an element, or a plurality of elements, e.g., a plurality of receivers and transmitters, which are units for communication with various other devices over a transmission medium. For example, the transceiver 302 receives external data from another device. The transceiver 302 is configured to transmit data processed by the processor 301 to the other device. A user interface 305, e.g., a keypad, a display, a loudspeaker, a microphone, a joystick, etc., can be further provided dependent upon the nature of a computing system.

The processor 301 is responsible for managing the bus 300 and performing normal processes, e.g., running a general operating system. The memory 304 can be configured to store data for use by the processor 301 in performing operations.

Optionally the processor 301 can be a Central Processing Unit (CPU), an Application Specific Integrated Circuit (ASIC), a Field-Programmable Gate Array (FPGA), or a Complex Programmable Logic Device (CPLD).

Figure 11:
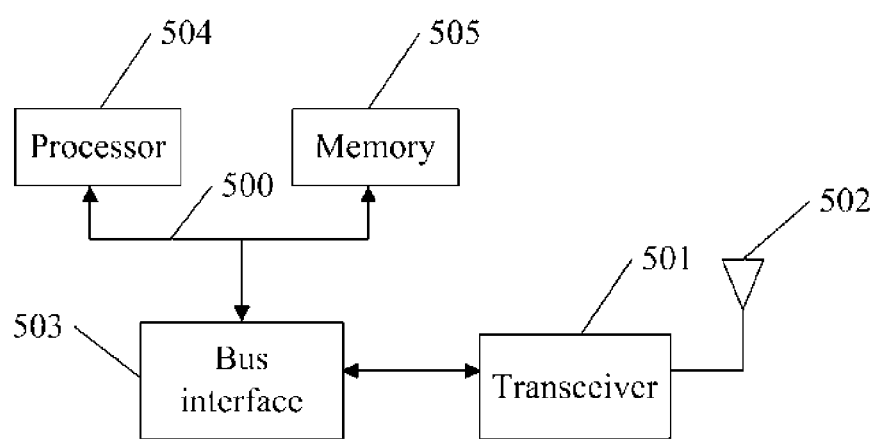
FIG. 11 is a schematic structural diagram of another device for receiving feedback information according to the embodiments of the application.

Referring to FIG. 11, another device for receiving feedback information according to the embodiments of the application includes a processor 504 configured to read and execute programs in a memory 505 to: transmit downlink transmission through a transceiver 501; and determine an uplink time domain resource position for transmitting ACK/NACK feedback information of the downlink transmission, according to at least a length of TTI of the downlink transmission and/or a second length of TTI, and receive the ACK/NACK feedback information of the downlink transmission at the uplink time domain resource position through the transceiver 501, where the second length of TTI is a length of TTI, configured by configuration signaling or predefined, for determining an uplink time domain resource position for transmitting ACK/NACK feedback information.

Optionally the processor 504 is configured to determine the uplink time domain resource position for transmitting the ACK/NACK feedback information of the downlink transmission, according to the length of TTI of the downlink transmission, and to receive the ACK/NACK feedback information of the downlink transmission at the uplink time domain resource position through the transceiver 501 as follows.

Determine to receive the ACK/NACK feedback information of the downlink transmission over a first uplink time domain resource that can be used to transmit ACK/NACK and satisfies a time length L1*k or L2*k symbols, after an end time position or an end symbol position of the downlink transmission.

Or, determine to receive the ACK/NACK feedback information of the downlink transmission over a first uplink time domain resource that can be used to transmit ACK/NACK and is no earlier than a time length L1*k or L2*k symbols, after an end time position or an end symbol position of the downlink transmission.

Or, determine to receive the ACK/NACK feedback information of the downlink transmission over a first uplink time domain resource that can be used to transmit ACK/NACK after a TTI with the index n+k, where TTIs are numbered as per the length of TTI of the downlink transmission, and the index of TTI of the downlink transmission is n.

Or, determine to receive the ACK/NACK feedback information of the downlink transmission over a first uplink time domain resource that can be used to transmit ACK/NACK and is spaced from an end time position or an end symbol position of the downlink transmission by no less than a time length L1*k or L2*k symbols.

Where L1 is the length of TTI of the downlink transmission in a unit of time, L2 is the length of TTI of the downlink transmission in a unit of symbol, and k is a predefined or preconfigured positive integer or decimal fraction.

Optionally the processor 504 is configured to determine the uplink time domain resource position for transmitting the ACK/NACK feedback information of the downlink transmission, according to the length of TTI of the downlink transmission and/or the second length of TTI, and to receive the ACK/NACK feedback information of the downlink transmission at the uplink time domain resource position through the transceiver 501 as follows.

Determine to receive the ACK/NACK feedback information of the downlink transmission over a first uplink time domain resource that can be used to transmit ACK/NACK and satisfies a time length L3*k or L4*k symbols, after an end time position or an end symbol position of the downlink transmission, wherein the end time position or the end symbol position of the downlink transmission is determined according to a first length of TTI.

Or, determine to receive the ACK/NACK feedback information of the downlink transmission over a first uplink time domain resource that can be used to transmit ACK/NACK and is no earlier than a time length L3*k or L4*k symbols, after an end time position or an end symbol position of the downlink transmission, wherein the end time position or the end symbol position of the downlink transmission is determined according to a first length of TTI.

Or, determine to receive the ACK/NACK feedback information of the downlink transmission over a first uplink time domain resource that can be used to transmit ACK/NACK after a TTI with the index n+k, where TTIs are numbered as per a first length of TTI, and the index of TTI of the downlink transmission is n.

Or, determine to receive the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols, wherein the end time position or the end symbol position of the downlink transmission is determined according to a first length of TTI.

Or, determine to receive the ACK/NACK feedback information of the downlink transmission over a first uplink time domain resource that can be used to transmit ACK/NACK and satisfies a time length L3*k or L4*k symbols, after an end time position or an end symbol position of the downlink transmission.

Or, determine to receive the ACK/NACK feedback information of the downlink transmission over a first uplink time domain resource that can be used to transmit ACK/NACK and is no earlier than a time length L3*k or L4*k symbols, after an end time position or an end symbol position of the downlink transmission.

Or, determine to receive the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols.

Where L3 is the first length of TTI in a unit of time, L4 is the first length of TTI in a unit of symbol, and k is a predefined or preconfigured positive integer or decimal fraction; and the first length of TTI is the second length of TTI, or the larger or smaller one or the average of the second length of TTI and the length of TTI of the downlink transmission.

Optionally the processor 504 is configured to determine the uplink time domain resource position for transmitting the ACK/NACK feedback information of the downlink transmission, according to at least the length of TTI of the downlink transmission and/or the second length of TTI as follows.

Determine the uplink time domain resource position for transmitting the ACK/NACK feedback information of the downlink transmission, according to the length of TTI of the downlink transmission and/or the second length of TTI, and a feedback delay configured by the configuration signaling.

Optionally the processor 504 is configured to determine the uplink time domain resource position for transmitting the ACK/NACK feedback information of the downlink transmission, according to the length of TTI of the downlink transmission and/or the second length of TTI, and the feedback delay configured by the configuration signaling as follows.

Determine preliminarily an uplink time domain resource position for transmitting the ACK/NACK feedback information of the downlink transmission according to the length of TTI of the downlink transmission and/or the second length of TTI.

Delay the preliminarily determined uplink time domain resource position for transmitting the ACK/NACK feedback information of the downlink transmission, according to the feedback delay configured by the configuration signaling, and determine the delayed uplink time domain resource position as a final uplink time domain resource position for transmitting the ACK/NACK feedback information of the downlink transmission.

Optionally the configuration signaling is higher-layer signaling, or the configuration signaling is carried in a first physical downlink control channel corresponding to the downlink transmission; and/or the configuration signaling configures the same second length of TTI or different second lengths of TTI for downlink transmission with different lengths of TTI.

Optionally the configuration signaling configures the second length of TTI as follows.

The configuration signaling indicates one of lengths of TTI in a predefined or preconfigured set of lengths of TTI for determining an uplink time domain resource position for transmitting ACK/NACK feedback information of the downlink transmission as the second length of TTI; or the configuration signaling indicates an offset between the second length of TTI and the length of TTI of the downlink transmission.

Optionally the uplink time domain resource over which ACK/NACK can be transmitted includes following resources.

A part or all of uplink sub-frames.

Or, a part or all of sub-frames including at least one symbol for uplink transmission.

Or, a part or all of sub-frames including such a quantity of consecutive symbols for uplink transmission that is no less than a preset number.

Or, a part or all of symbols or TTIs for uplink transmission.

Or, a part or all of symbols or TTIs in a part or all of uplink sub-frames.

Or, A symbols or B TTIs in a part or all of uplink sub-frames, where A is the quantity of symbols to be occupied for transmitting the ACK/NACK feedback information, and A is a positive integer; and B is the quantity of TTIs to be occupied for transmitting the ACK/NACK feedback information, and B is a positive integer.

Or, a part or all of symbols or TTIs for uplink transmission in a part or all of sub-frames for uplink transmission including at least one symbol for uplink transmission.

Or, A symbols or B TTIs in a part or all of sub-frames including at least one symbol for uplink transmission.

Or, a part or all of symbols or TTIs for uplink transmission in a part or all of sub-frames including such a quantity of consecutive symbols for uplink transmission that is no less than a preset number.

Or, A symbols or B TTIs in a part or all of sub-frames including such a quantity of consecutive symbols for uplink transmission that is no less than a preset number.

Optionally when the processor 504 determines that ACK/NACK feedback information of a plurality of instances of the downlink transmission is transmitted at the same uplink time domain resource, the processor is configured to determine that the ACK/NACK feedback information is obtained by concatenating the ACK/NACK feedback information corresponding respectively to the plurality of instances of the downlink transmission according to DAI indication fields in DCI of first physical downlink control channels corresponding respectively to the plurality of instances of the downlink transmission.

Optionally the downlink transmission is a first physical downlink control channel indicating a downlink SPS resource release, or a first physical downlink shared channel with a corresponding first physical downlink control channel, or a first physical downlink shared channel without a corresponding first physical downlink control channel.

Optionally the second length of TTI is an elementary short length of TTI, and the elementary short length of TTI is an elementary transmission unit in the time domain; or the second length of TTI is one of a plurality of system supported lengths of TTI.

The transceiver 501 is configured to receive and transmit data over the control of the processor 504.

In FIG. 11, the bus architecture (represented as a bus 500), the bus 500 can include any quantity of interconnecting buses and bridges to particularly link together various circuits including one or more processors represented by the processor 504, and one or more memories represented by the memory 505. The bus 500 can further link together various other circuits, e.g., a peripheral device, a manostat, a power management circuit, etc., all of which are well known in the art, so a further description thereof will be omitted in this context. A bus interface 503 serves as an interface between the bus 500 and the transceiver 501. The transceiver 501 can be an element, or a plurality of elements, e.g., a plurality of receivers and transmitters, which are units for communication with various other devices over a transmission medium. Data processed by the processor 504 are transmitted a wireless medium through an antenna 502, and furthermore the antenna 502 receives and transports data to the processor 504.

The processor 504 is responsible for managing the bus 500 and performing normal processes, and can further provide various functions, e.g., timing, a peripheral interface, voltage regulation, power source management, and other control functions. The memory 505 can be configured to store data for use by the processor 504 in performing operations.

Optionally the processor 504 can be a Central Processing Unit (CPU), an Application Specific Integrated Circuit (ASIC), a Field-Programmable Gate Array (FPGA), or a Complex Programmable Logic Device (CPLD).

In summary, in the embodiments of the application, there is provided a solution to transmitting ACK/NACK feedback information of downlink transmission with a shortened TTI to thereby support normal feedback of ACK/NACK of downlink transmission with a varying length of TTI so as to shorten a feedback delay, and thus a system delay.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the application have been described, those skilled in the art benefiting from the underlying inventive concept can make additional modifications and variations to these embodiments. Therefore the appended claims are intended to be construed as encompassing the preferred embodiments and all the modifications and variations coming into the scope of the application.

Evidently those skilled in the art can make various modifications and variations to the application without departing from the spirit and scope of the application. Thus the application is also intended to encompass these modifications and variations thereto so long as the modifications and variations come into the scope of the claims appended to the application and their equivalents.

What is claimed is:

1. A method for transmitting feedback information, the method comprising:
    receiving downlink transmission; and
    determining an uplink time domain resource position for transmitting Acknowledgement/Non-Acknowledgment (ACK/NACK) feedback information of the downlink transmission, according to at least a length of Transmission Time Interval (TTI) of the downlink transmission and/or a second length of TTI, and transmitting the ACK/NACK feedback information of the downlink transmission at the uplink time domain resource position;

wherein the second length of TTI is a length of TTI, configured by configuration signaling or predefined, for determining an uplink time domain resource position for transmitting ACK/NACK feedback information.

2. The method according to claim 1, wherein determining the uplink time domain resource position for transmitting the ACK/NACK feedback information of the downlink transmission, according to the length of TTI of the downlink transmission, and transmitting the ACK/NACK feedback information of the downlink transmission at the uplink time domain resource position, comprises:

determining to transmit the ACK/NACK feedback information of the downlink transmission over a first uplink time domain resource that can be used to transmit ACK/NACK and satisfies a time length L1*k or L2*k symbols, after an end time position or an end symbol position of the downlink transmission; or determining to transmit the ACK/NACK feedback information of the downlink transmission over a first uplink time domain resource that can be used to transmit ACK/NACK and is no earlier than a time length L1*k or L2*k symbols, after an end time position or an end symbol position of the downlink transmission; or determining to transmit the ACK/NACK feedback information of the downlink transmission over a first uplink time domain resource that can be used to transmit ACK/NACK after a TTI with an index n+k, where TTIs are numbered as per the length of TTI of the downlink transmission, and an index of TTI of the downlink transmission is n; or determining to transmit the ACK/NACK feedback information of the downlink transmission over a first uplink time domain resource that can be used to transmit ACK/NACK and is spaced from an end time position or an end symbol position of the downlink transmission by no less than a time length L1*k or L2*k symbols;

wherein L1 is the length of TTI of the downlink transmission in a unit of time, L2 is the length of TTI of the downlink transmission in a unit of symbol, and k is a predefined or preconfigured positive integer or decimal fraction.

3. The method according to claim 1, wherein the configuration signaling configures the second length of TTI as follows:

the configuration signaling indicates one of lengths of TTI in a predefined or preconfigured set of lengths of TTI for determining the uplink time domain resource position for transmitting the ACK/NACK feedback information of the downlink transmission as the second length of TTI; or the configuration signaling indicates an offset between the second length of TTI and the length of TTI of the downlink transmission.

4. The method according to claim 1, wherein:

the second length of TTI is an elementary short length of TTI, and the elementary short length of TTI is an elementary transmission unit in a time domain; or the second length of TTI is one of a plurality of system supported lengths of TTI.

5. The method according to claim 1, wherein determining the uplink time domain resource position for transmitting the ACK/NACK feedback information of the downlink transmission, according to the length of TTI of the downlink transmission and/or the second length of TTI, and transmitting the ACK/NACK feedback information of the downlink transmission at the uplink time domain resource position, comprises:

determining to transmit the ACK/NACK feedback information of the downlink transmission over a first uplink time domain resource that can be used to transmit ACK/NACK and satisfies a time length L3*k or L4*k symbols, after an end time position or an end symbol position of the downlink transmission, wherein the end time position or the end symbol position of the downlink transmission is determined according to a first length of TTI; or determining to transmit the ACK/NACK feedback information of the downlink transmission over a first uplink time domain resource that can be used to transmit ACK/NACK and is no earlier than a time length L3*k or L4*k symbols, after an end time position or an end symbol position of the downlink transmission, wherein the end time position or the end symbol position of the downlink transmission is determined according to a first length of TTI; or determining to transmit the ACK/NACK feedback information of the downlink transmission over a first uplink time domain resource that can be used to transmit ACK/NACK after a TTI with an index n+k, where TTIs are numbered as per a first length of TTI, and an index of TTI of the downlink transmission is n; or determining to transmit the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols, wherein the end time position or the end symbol position of the downlink transmission is determined according to a first length of TTI; or determining to transmit the ACK/NACK feedback information of the downlink transmission over a first uplink time domain resource that can be used to transmit ACK/NACK and satisfies a time length L3*k or L4*k symbols, after an end time position or an end symbol position of the downlink transmission; or determining to transmit the ACK/NACK feedback information of the downlink transmission over a first uplink time domain resource that can be used to transmit ACK/NACK and is no earlier than a time length L3*k or L4*k symbols, after an end time position or an end symbol position of the downlink transmission; or determining to transmit the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols;

wherein L3 is the first length of TTI in a unit of time, L4 is the first length of TTI in a unit of symbol, and k is a predefined or preconfigured positive integer or decimal fraction; and the first length of TTI is the second length of TTI, or a larger one or a smaller one or an average of the second length of TTI and the length of TTI of the downlink transmission.

6. The method according to claim 1, wherein determining the uplink time domain resource position for transmitting the ACK/NACK feedback information of the downlink transmission, according to at least the length of TTI of the downlink transmission and/or the second length of TTI, comprises:

determining the uplink time domain resource position for transmitting the ACK/NACK feedback information of the downlink transmission, according to the length of TTI of the downlink transmission and/or the second length of TTI, and a feedback delay configured by the configuration signaling.

7. The method according to claim 6, wherein determining the uplink time domain resource position for transmitting the ACK/NACK feedback information of the downlink transmission, according to the length of TTI of the downlink transmission and/or the second length of TTI, and the feedback delay configured by the configuration signaling, comprises:
determining preliminarily an uplink time domain resource position for transmitting the ACK/NACK feedback information of the downlink transmission according to the length of TTI of the downlink transmission and/or the second length of TTI; and
delaying the preliminarily determined uplink time domain resource position for transmitting the ACK/NACK feedback information of the downlink transmission, according to the feedback delay configured by the configuration signaling, and determining the delayed uplink time domain resource position as a final uplink time domain resource position for transmitting the ACK/NACK feedback information of the downlink transmission.

8. A method for receiving feedback information, the method comprising:
transmitting downlink transmission; and
determining an uplink time domain resource position for transmitting Acknowledgement/Non-Acknowledgment (ACK/NACK) feedback information of the downlink transmission, according to at least a length of Transmission Time Interval (TTI) of the downlink transmission and/or a second length of TTI, and receiving the ACK/NACK feedback information of the downlink transmission at the uplink time domain resource position;
wherein the second length of TTI is a length of TTI, configured by configuration signaling or predefined, for determining an uplink time domain resource position for transmitting ACK/NACK feedback information.

9. The method according to claim 8, wherein determining the uplink time domain resource position for transmitting the ACK/NACK feedback information of the downlink transmission, according to the length of TTI of the downlink transmission, and receiving the ACK/NACK feedback information of the downlink transmission at the uplink time domain resource position, comprises:
determining to receive the ACK/NACK feedback information of the downlink transmission over a first uplink time domain resource that can be used to transmit ACK/NACK and satisfies a time length L1*k or L2*k symbols, after an end time position or an end symbol position of the downlink transmission; or
determining to receive the ACK/NACK feedback information of the downlink transmission over a first uplink time domain resource that can be used to transmit ACK/NACK and is no earlier than a time length L1*k or L2*k symbols, after an end time position or an end symbol position of the downlink transmission; or
determining to receive the ACK/NACK feedback information of the downlink transmission over a first uplink time domain resource that can be used to transmit ACK/NACK after a TTI with an index n+k, where TTIs are numbered as per the length of TTI of the downlink transmission, and an index of TTI of the downlink transmission is n; or
determining to receive the ACK/NACK feedback information of the downlink transmission over a first uplink time domain resource that can be used to transmit ACK/NACK and is spaced from an end time position or an end symbol position of the downlink transmission by no less than a time length L1*k or L2*k symbols;
wherein L1 is the length of TTI of the downlink transmission in a unit of time, L2 is the length of TTI of the downlink transmission in a unit of symbol, and k is a predefined or preconfigured positive integer or decimal fraction.

10. The method according to claim 8, wherein the configuration signaling configures the second length of TTI as follows:
the configuration signaling indicates one of lengths of TTI in a predefined or preconfigured set of lengths of TTI for determining the uplink time domain resource position for transmitting the ACK/NACK feedback information of the downlink transmission as the second length of TTI; or
the configuration signaling indicates an offset between the second length of TTI and the length of TTI of the downlink transmission.

11. The method according to claim 8, wherein:
the second length of TTI is an elementary short length of TTI, and the elementary short length of TTI is an elementary transmission unit in a time domain; or
the second length of TTI is one of a plurality of system supported lengths of TTI.

12. The method according to claim 8, wherein determining the uplink time domain resource position for transmitting the ACK/NACK feedback information of the downlink transmission, according to the length of TTI of the downlink transmission and/or the second length of TTI, and receiving the ACK/NACK feedback information of the downlink transmission at the uplink time domain resource position, comprises:
determining to receive the ACK/NACK feedback information of the downlink transmission over a first uplink time domain resource that can be used to transmit ACK/NACK and satisfies a time length L3*k or L4*k symbols, after an end time position or an end symbol position of the downlink transmission, wherein the end time position or the end symbol position of the downlink transmission is determined according to a first length of TTI; or
determining to receive the ACK/NACK feedback information of the downlink transmission over a first uplink time domain resource that can be used to transmit ACK/NACK and is no earlier than a time length L3*k or L4*k symbols, after an end time position or an end symbol position of the downlink transmission, wherein the end time position or the end symbol position of the downlink transmission is determined according to a first length of TTI; or
determining to receive the ACK/NACK feedback information of the downlink transmission over a first uplink time domain resource that can be used to transmit ACK/NACK after a TTI with an index n+k, where TTIs are numbered as per a first length of TTI, and an index of TTI of the downlink transmission is n; or
determining to receive the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols, wherein the end time position or the end symbol position of the downlink transmission is determined according to a first length of TTI; or
determining to receive the ACK/NACK feedback information of the downlink transmission over a first uplink time domain resource that can be used to transmit ACK/NACK and satisfies a time length L3*k or L4*k symbols, after an end time position or an end symbol position of the downlink transmission; or
determining to receive the ACK/NACK feedback information of the downlink transmission over a first uplink time domain resource that can be used to transmit ACK/NACK and is no earlier than a time length L3*k or L4*k symbols, after an end time position or an end symbol position of the downlink transmission; or
determining to receive the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols;
wherein L3 is the first length of TTI in a unit of time, L4 is the first length of TTI in a unit of symbol, and k is a predefined or preconfigured positive integer or decimal fraction; and the first length of TTI is the second length of TTI, or a larger one or a smaller one or an average of the second length of TTI and the length of TTI of the downlink transmission.

13. The method according to claim 8, wherein determining the uplink time domain resource position for transmitting the ACK/NACK feedback information of the downlink transmission, according to at least the length of TTI of the downlink transmission and/or the second length of TTI, comprises:
determining the uplink time domain resource position for transmitting the ACK/NACK feedback information of the downlink transmission, according to the length of TTI of the downlink transmission and/or the second length of TTI, and a feedback delay configured by the configuration signaling.

14. The method according to claim 13, wherein determining the uplink time domain resource position for transmitting the ACK/NACK feedback information of the downlink transmission, according to the length of TTI of the downlink transmission and/or the second length of TTI, and the feedback delay configured by the configuration signaling, comprises:
determining preliminarily an uplink time domain resource position for transmitting the ACK/NACK feedback information of the downlink transmission according to the length of TTI of the downlink transmission and/or the second length of TTI; and
delaying the preliminarily determined uplink time domain resource position for transmitting the ACK/NACK feedback information of the downlink transmission, according to the feedback delay configured by the configuration signaling, and determining the delayed uplink time domain resource position as a final uplink time domain resource position for transmitting the ACK/NACK feedback information of the downlink transmission.

15. A device for transmitting feedback information, the device comprising at least one processor and a memory; wherein the memory is configured to store computer readable program codes, and the at least one processor is configured to execute the computer readable program codes to:

receive downlink transmission; and
determine an uplink time domain resource position for transmitting Acknowledgement/Non-Acknowledgment (ACK/NACK) feedback information of the downlink transmission, according to at least a length of Transmission Time Interval (TTI) of the downlink transmission and/or a second length of TTI, and to transmit the ACK/NACK feedback information of the downlink transmission at the uplink time domain resource position;
wherein the second length of TTI is a length of TTI, configured by configuration signaling or predefined, for determining an uplink time domain resource position for transmitting ACK/NACK feedback information.

16. The device according to claim 15, wherein the at least one processor is configured to execute the computer readable program codes to determine the uplink time domain resource position for transmitting the ACK/NACK feedback information of the downlink transmission, according to the length of TTI of the downlink transmission, and to transmit the ACK/NACK feedback information of the downlink transmission at the uplink time domain resource position as follows:
determine to transmit the ACK/NACK feedback information of the downlink transmission over a first uplink time domain resource that can be used to transmit ACK/NACK and satisfies a time length L1*k or L2*k symbols, after an end time position or an end symbol position of the downlink transmission; or
determine to transmit the ACK/NACK feedback information of the downlink transmission over a first uplink time domain resource that can be used to transmit ACK/NACK and is no earlier than a time length L1*k or L2*k symbols, after an end time position or an end symbol position of the downlink transmission; or
determine to transmit the ACK/NACK feedback information of the downlink transmission over a first uplink time domain resource that can be used to transmit ACK/NACK after a TTI with an index n+k, where TTIs are numbered as per the length of TTI of the downlink transmission, and an index of TTI of the downlink transmission is n; or
determine to transmit the ACK/NACK feedback information of the downlink transmission over a first uplink time domain resource that can be used to transmit ACK/NACK and is spaced from an end time position or an end symbol position of the downlink transmission by no less than a time length L1*k or L2*k symbols;
wherein L1 is the length of TTI of the downlink transmission in a unit of time, L2 is the length of TTI of the downlink transmission in a unit of symbol, and k is a predefined or preconfigured positive integer or decimal fraction.

17. The device according to claim 15, wherein the configuration signaling configures the second length of TTI as follows:
the configuration signaling indicates one of lengths of TTI in a predefined or preconfigured set of lengths of TTI for determining the uplink time domain resource position for transmitting the ACK/NACK feedback information of the downlink transmission as the second length of TTI; or
the configuration signaling indicates an offset between the second length of TTI and the length of TTI of the downlink transmission.

18. The device according to claim 15, wherein:
the second length of TTI is an elementary short length of TTI, and the elementary short length of TTI is an elementary transmission unit in a time domain; or
the second length of TTI is one of a plurality of system supported lengths of TTI.

19. The device according to claim 15, wherein the at least one processor is configured to execute the computer readable program codes to determine the uplink time domain resource position for transmitting the ACK/NACK feedback information of the downlink transmission, according to the length of TTI of the downlink transmission and/or the second length of TTI, and to transmit the ACK/NACK feedback information of the downlink transmission at the uplink time domain resource position as follows:
determine to transmit the ACK/NACK feedback information of the downlink transmission over a first uplink time domain resource that can be used to transmit ACK/NACK and satisfies a time length L3*k or L4*k symbols, after an end time position or an end symbol position of the downlink transmission, wherein the end time position or the end symbol position of the downlink transmission is determined according to a first length of TTI; or
determine to transmit the ACK/NACK feedback information of the downlink transmission over a first uplink time domain resource that can be used to transmit ACK/NACK and is no earlier than a time length L3*k or L4*k symbols, after an end time position or an end symbol position of the downlink transmission, wherein the end time position or the end symbol position of the downlink transmission is determined according to a first length of TTI; or
determine to transmit the ACK/NACK feedback information of the downlink transmission over a first uplink time domain resource that can be used to transmit ACK/NACK after a TTI with an index n+k, where TTIs are numbered as per a first length of TTI, and an index of TTI of the downlink transmission is n; or
determine to transmit the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols, wherein the end time position or the end symbol position of the downlink transmission is determined according to a first length of TTI; or
determine to transmit the ACK/NACK feedback information of the downlink transmission over a first uplink time domain resource that can be used to transmit ACK/NACK and satisfies a time length L3*k or L4*k symbols, after an end time position or an end symbol position of the downlink transmission; or
determine to transmit the ACK/NACK feedback information of the downlink transmission over a first uplink time domain resource that can be used to transmit ACK/NACK and is no earlier than a time length L3*k or L4*k symbols, after an end time position or an end symbol position of the downlink transmission; or
determine to transmit the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols;

wherein L3 is the first length of TTI in a unit of time, L4 is the first length of TTI in a unit of symbol, and k is a predefined or preconfigured positive integer or decimal fraction; and the first length of TTI is the second length of TTI, or a larger one or a smaller one or an average of the second length of TTI and the length of TTI of the downlink transmission.

20. The device according to claim 15, wherein the at least one processor is configured to execute the computer readable program codes to determine the uplink time domain resource position for transmitting the ACK/NACK feedback information of the downlink transmission, according to at least the length of TTI of the downlink transmission and/or the second length of TTI as follows:
determine the uplink time domain resource position for transmitting the ACK/NACK feedback information of the downlink transmission, according to the length of TTI of the downlink transmission and/or the second length of TTI, and a feedback delay configured by the configuration signaling.

21. The device according to claim 20, wherein the at least one processor is configured to execute the computer readable program codes to determine the uplink time domain resource position for transmitting the ACK/NACK feedback information of the downlink transmission, according to the length of TTI of the downlink transmission and/or the second length of TTI, and the feedback delay configured by the configuration signaling as follows:
determine preliminarily an uplink time domain resource position for transmitting the ACK/NACK feedback information of the downlink transmission according to the length of TTI of the downlink transmission and/or the second length of TTI; and
delay the preliminarily determined uplink time domain resource position for transmitting the ACK/NACK feedback information of the downlink transmission, according to the feedback delay configured by the configuration signaling, and determine the delayed uplink time domain resource position as a final uplink time domain resource position for transmitting the ACK/NACK feedback information of the downlink transmission.

22. A device for receiving feedback information, the device comprising at least one processor and a memory; wherein the memory is configured to store computer readable program codes, and the at least one processor is configured to execute the computer readable program codes to:
transmit downlink transmission; and
determine an uplink time domain resource position for transmitting Acknowledgement/Non-Acknowledgment (ACK/NACK) feedback information of the downlink transmission, according to at least a length of Transmission Time Interval (TTI) of the downlink transmission and/or a second length of TTI, and to receive the ACK/NACK feedback information of the downlink transmission at the uplink time domain resource position, wherein the second length of TTI is a length of TTI, configured by configuration signaling or predefined, for determining an uplink time domain resource position for transmitting ACK/NACK feedback information.

23. The device according to claim 22, wherein the at least one processor is configured to execute the computer readable program codes to determine the uplink time domain resource position for transmitting the ACK/NACK feedback information of the downlink transmission, according to the length of TTI of the downlink transmission, and to receive the ACK/NACK feedback information of the downlink transmission at the uplink time domain resource position as follows:
- determine to receive the ACK/NACK feedback information of the downlink transmission over a first uplink time domain resource that can be used to transmit ACK/NACK and satisfies a time length L1*k or L2*k symbols, after an end time position or an end symbol position of the downlink transmission; or
- determine to receive the ACK/NACK feedback information of the downlink transmission over a first uplink time domain resource that can be used to transmit ACK/NACK and is no earlier than a time length L1*k or L2*k symbols, after an end time position or an end symbol position of the downlink transmission; or
- determine to receive the ACK/NACK feedback information of the downlink transmission over a first uplink time domain resource that can be used to transmit ACK/NACK after a TTI with an index n+k, where TTIs are numbered as per the length of TTI of the downlink transmission, and an index of TTI of the downlink transmission is n; or
- determine to receive the ACK/NACK feedback information of the downlink transmission over a first uplink time domain resource that can be used to transmit ACK/NACK and is spaced from an end time position or an end symbol position of the downlink transmission by no less than a time length L1*k or L2*k symbols;
- wherein L1 is the length of TTI of the downlink transmission in a unit of time, L2 is the length of TTI of the downlink transmission in a unit of symbol, and k is a predefined or preconfigured positive integer or decimal fraction.

24. The device according to claim 22, wherein the configuration signaling configures the second length of TTI as follows:
- the configuration signaling indicates one of lengths of TTI in a predefined or preconfigured set of lengths of TTI for determining the uplink time domain resource position for transmitting the ACK/NACK feedback information of the downlink transmission as the second length of TTI; or
- the configuration signaling indicates an offset between the second length of TTI and the length of TTI of the downlink transmission.

25. The device according to claim 22, wherein:
- the second length of TTI is an elementary short length of TTI, and the elementary short length of TTI is an elementary transmission unit in a time domain; or
- the second length of TTI is one of a plurality of system supported lengths of TTI.

26. The device according to claim 22, wherein the at least one processor is configured to execute the computer readable program codes to determine the uplink time domain resource position for transmitting the ACK/NACK feedback information of the downlink transmission, according to the length of TTI of the downlink transmission and/or the second length of TTI, and to receive the ACK/NACK feedback information of the downlink transmission at the uplink time domain resource position as follows:
- determine to receive the ACK/NACK feedback information of the downlink transmission over a first uplink time domain resource that can be used to transmit ACK/NACK and satisfies a time length L3*k or L4*k symbols, after an end time position or an end symbol position of the downlink transmission, wherein the end time position or the end symbol position of the downlink transmission is determined according to a first length of TTI; or
- determine to receive the ACK/NACK feedback information of the downlink transmission over a first uplink time domain resource that can be used to transmit ACK/NACK and is no earlier than a time length L3*k or L4*k symbols, after an end time position or an end symbol position of the downlink transmission, wherein the end time position or the end symbol position of the downlink transmission is determined according to a first length of TTI; or
- determine to receive the ACK/NACK feedback information of the downlink transmission over a first uplink time domain resource that can be used to transmit ACK/NACK after a TTI with an index n+k, where TTIs are numbered as per a first length of TTI, and an index of TTI of the downlink transmission is n; or
- determine to receive the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols, wherein the end time position or the end symbol position of the downlink transmission is determined according to a first length of TTI; or
- determine to receive the ACK/NACK feedback information of the downlink transmission over a first uplink time domain resource that can be used to transmit ACK/NACK and satisfies a time length L3*k or L4*k symbols, after an end time position or an end symbol position of the downlink transmission; or
- determine to receive the ACK/NACK feedback information of the downlink transmission over a first uplink time domain resource that can be used to transmit ACK/NACK and is no earlier than a time length L3*k or L4*k symbols, after an end time position or an end symbol position of the downlink transmission; or
- determine to receive the ACK/NACK feedback information of the downlink transmission over a first uplink time domain resource that can be used to transmit ACK/NACK and is spaced from an end time position or an end symbol position of the downlink transmission by no less than a time length L3*k or L4*k symbols;
- wherein L3 is the first length of TTI in a unit of time, L4 is the first length of TTI in a unit of symbol, and k is a predefined or preconfigured positive integer or decimal fraction; and the first length of TTI is the second length of TTI, or a larger one or a smaller one or an average of the second length of TTI and the length of TTI of the downlink transmission.

27. The device according to claim 22, wherein the at least one processor is configured to execute the computer readable program codes to determine the uplink time domain resource position for transmitting the ACK/NACK feedback information of the downlink transmission, according to at least the length of TTI of the downlink transmission and/or the second length of TTI as follows:
- determine the uplink time domain resource position for transmitting the ACK/NACK feedback information of the downlink transmission, according to the length of TTI of the downlink transmission and/or the second length of TTI, and a feedback delay configured by the configuration signaling.

28. The device according to claim 27, wherein the at least one processor is configured to execute the computer readable program codes to determine the uplink time domain resource position for transmitting the ACK/NACK feedback information of the downlink transmission, according to the length of TTI of the downlink transmission and/or the second length of TTI, and the feedback delay configured by the configuration signaling as follows:
- determine preliminarily an uplink time domain resource position for transmitting the ACK/NACK feedback information of the downlink transmission according to the length of TTI of the downlink transmission and/or the second length of TTI; and
- delay the preliminarily determined uplink time domain resource position for transmitting the ACK/NACK feedback information of the downlink transmission, according to the feedback delay configured by the configuration signaling, and determine the delayed uplink time domain resource position as a final uplink time domain resource position for transmitting the ACK/NACK feedback information of the downlink transmission.

* * * * *